(12) United States Patent
Townsend

(10) Patent No.: US 8,052,857 B2
(45) Date of Patent: Nov. 8, 2011

(54) PROCESS FOR ANODIZING A ROBOTIC DEVICE

(75) Inventor: William T. Townsend, Weston, MA (US)

(73) Assignee: Barrett Technology, Inc., Cambridge, MA (US)

( * ) Notice: Subject to any disclaimer, the term of this patent is extended or adjusted under 35 U.S.C. 154(b) by 1159 days.

(21) Appl. No.: 11/515,107

(22) Filed: Aug. 31, 2006

(65) Prior Publication Data

US 2007/0039831 A1 Feb. 22, 2007

Related U.S. Application Data

(62) Division of application No. 10/672,888, filed on Sep. 26, 2003, now Pat. No. 7,168,748.

(60) Provisional application No. 60/414,044, filed on Sep. 26, 2002.

(51) Int. Cl.
*C25D 11/04* (2006.01)
*C25D 7/00* (2006.01)

(52) U.S. Cl. ........ 205/122; 205/128; 205/136; 205/145; 205/324

(58) Field of Classification Search .................. 205/122, 205/128, 136
See application file for complete search history.

(56) References Cited

U.S. PATENT DOCUMENTS

| | | | |
|---|---|---|---|
| 3,940,321 A * | 2/1976 | Adams | 205/175 |
| 4,957,320 A | 9/1990 | Ulrich | |
| 5,004,399 A * | 4/1991 | Sullivan et al. | 414/729 |
| 5,207,114 A | 5/1993 | Salisbury, Jr. et al. | |
| 5,501,498 A | 3/1996 | Ulrich | |
| 5,670,034 A * | 9/1997 | Lowery | 205/143 |
| 5,958,206 A * | 9/1999 | Rothbauer et al. | 205/96 |
| 7,118,658 B2 * | 10/2006 | Woodruff et al. | 204/242 |

OTHER PUBLICATIONS

Mark E. Rosheim, Robot Evolution, The Development of Anthrorobotics (1994), pp. 195-225.

* cited by examiner

*Primary Examiner* — Alexa Neckel
*Assistant Examiner* — William Leader
(74) *Attorney, Agent, or Firm* — Pandiscio & Pandiscio

(57) ABSTRACT

A robotic device has a base and at least one finger having at least two links that are connected in series on rotary joints with at least two degrees of freedom. A brushless motor and an associated controller are located at each joint to produce a rotational movement of a link. Wires for electrical power and communication serially connect the controllers in a distributed control network. A network operating controller coordinates the operation of the network, including power distribution. At least one, but more typically two to five, wires interconnect all the controllers through one or more joints. Motor sensors and external world sensors monitor operating parameters of the robotic hand. The electrical signal output of the sensors can be input anywhere on the distributed control network. V-grooves on the robotic hand locate objects precisely and assist in gripping. The hand is sealed, immersible and has electrical connections through the rotary joints for anodizing in a single dunk without masking. In various forms, this intelligent, self-contained, dexterous hand, or combinations of such hands, can perform a wide variety of object gripping and manipulating tasks, as well as locomotion and combinations of locomotion and gripping.

4 Claims, 18 Drawing Sheets

PROCESS FOR ANODIZING A ROBOTIC DEVICE

CROSS REFERENCE TO RELATED APPLICATIONS

This application is a divisional of application Ser. No. 10/672,888 filed Sep. 26, 2003, now U.S. Pat. No. 7,168,748, which application claims the benefit of U.S. provisional application No. 60/414,044 filed on Sep. 26, 2002.

GOVERNMENT LICENSE RIGHTS

The U.S. Government has a paid-up license in this invention and the right in limited circumstances to require the patent owner to license others on reasonable terms as provided for by the terms of Contract No. DE-RA 26-01 NT 4103 awarded by the Department of Energy.

BACKGROUND OF THE INVENTION

The present invention relates to robotics, and more specifically to a practical, self-contained robotic device that in one form closely simulates a human hand in dexterity, as well as an anodizing process used in making the robotic device.

Robots hold the promise of relieving workers from dirty and dangerous tasks; improving the quality of products; improving the efficacy of surgical procedures; and liberating the aged and infirmed with the dignity of self-sufficiency. And, in a world economy increasingly dependent on productivity, robotics holds the promise of a critically relevant technology.

Robotics, however, at present does not contribute significantly to the economy and society. For example, within the present US approximately $10 trillion economy, the robotics market is only about $1.2 billion (annual installations measured at the peak of the recent economic boom). That is only $1/100^{th}$ of one percent. By comparison, the scented-candle market in the U.S. is presently about $3 billion.

As a symptom of their failure, robots tend to execute only repetitive tasks, such as: go to point A, close gripper, go to point B, release gripper, repeat, repeat, repeat. Industrial robots spend their entire lives repeating steps like these, making them expensive alternatives for the equally effective dedicated machinery that they replace.

Herein, the broadest meaning of "robotic arm" is used to include any mechanical means of transporting a robotic tool or robotic hand to perform one or a number of tasks. The term applies whether the mechanical means is made of any combination of serial and parallel link(s), whether it includes any combination of rotating and sliding joint(s), or whether combining motion along tracks. The term also includes transport by robotic vehicles, whether tracked, wheeled, legged, waterborne, air-borne, space-borne whether or not combined with the above forms. From a controls standpoint, the transporting means can be autonomous (guided by machine intelligence), teleoperated (guided by human intelligence), or any combination of autonomous and teleoperated control.

Herein, the broadest meaning of "robotic hand" is used to mean any practical tool that performs mechanical functions, such as gripping, grasping and/or manipulating objects in its environment.

The purpose of robotic systems is to do useful tasks. In a robotic system, it is the tool and not the robotic arm that interacts directly with the task. The tool faces complexities and variations that are unique to every task object. Distinguishing between the robotic arm and the tool it carries is not arbitrary. Rather, market forces drive this split. The dividing plane between the robotic arm and the tool is sharply demarked by the outside face of the last component on the robot arm—the tool plate—a circular plate capping the last link with screw threads and alignment features for securely fastening the tool.

On the robot side of this face is the robotic arm and its supporting electronics and controllers. These robotic arms are mass-produced by one of a dozen or so multinational robotic-arm manufacturers that compete on slim margins with economies of scale. These companies have avoided "one-off" customization by nurturing a cottage industry of local systems integrators who customize robot trajectories in software and customize the tools in metal.

Robotic hands can be classified into three levels of sophistication.

The least sophisticated robotic hand has pincer fingers or "jaws", typically two or three in number, that close and open to clamp and release objects of similar geometry based on external actuation, such as pneumatic pressure. This type of hand is used commonly in commercial and industrial robotics. Often the finger surfaces are custom shaped for a particular object in a fixed orientation. "Soft jaws" are often used to effect this customizing. They are pieces of a readily machinable metal (aluminum or steel) or other structural material, replaceably secured to pincers or articulated fingers to effect this tailoring. Then, to handle more than one shape, or to handle one shape in a variety of orientations, the operator commonly uses a tool changer to switch from one hand to another hand with different customized finger shapes.

Hands that can grasp are the next more sophisticated. They typically have articulated "fingers" that can wrap around an object, not merely clamp it.

The next most sophisticated robotic hand can not only grip and grasp, but has a dexterity, through multiple degrees of freedom, and multiple articulated links, that can also manipulate objects that are gripped or grasped. The most sophisticated robotic hand has motors and sensors synthesized by machine intelligence with electronic communications to other devices. The mechanical actions can arbitrarily grasp and/or manipulate a variety of objects of different shapes, sizes, and other varying combinations of physical properties.

The term "practical" provides a very important distinction between hands that can function in a laboratory setting, or in some highly specialized environment, ones that will be termed herein "academic", and hands that are sufficiently compact, robust (rugged and durable), modular, lightweight, and cost effective to be useful commercially and in industrial applications. For example a practical hand should be light enough to be attached to commercially available robotic arms without reducing the resulting effective payload rating to zero. In conventional industrial robotics, a controller box is located on the floor near, or built into, the base of the robot arm. The robotic arm ends in a tool plate. Robotic arms typically weigh 50-100 times their rated payloads, so that a 10 kg payload requires a robotic arm weighing nearly a metric ton. A practical hand should also be modularly attachable to the robotic tool-plate.

"Practical" also means that the hand is suitably designed to survive the demands and environmental conditions of its intended task. The restriction on practicality excludes all but the simplest previous robotic hands that, while otherwise sophisticated or dexterous, were never intended for practical use on a commercial robotic arm. These several dozen non-practical robotic hands have been used in the academic study of the science of the force interactions of fingers against objects, mathematical analysis of grasp stability, and as engineering projects in graduate schools. *Robot Evolution, The Development of Anthrorobotics*, by Mark E. Rosheim (1994) gives an overview of such "academic" hands at pp. 195-225. Another dexterous hand, one developed at the University of Pennsylvania, is described in U.S. Pat. Nos. 4,957,320 and 5,501,498, both to Ulrich. To the best of applicants' knowledge, none of these hands is used commercially or industrially.

Compactness is another practical consideration, particularly as it relates to control. Articulated joints require the physical routings of wires for power and communication from a control box to the point(s) of articulation.

Typically, fat bundles of wire extend from the control box to the robot arm and an attached hand. For a practical hand, this means that bundles of wire are accommodated and routed through joints, and be subjected to millions of cycles of flexure. Design problems are increased, and durability ("robustness") is seriously adversely affected. Also, a prototype dexterous hand is rendered impractical when its electronics and drive components are too bulky, requiring an increase in the height of the hand. The distance from the wrist center to the payload center, which is directly dependent on the hand height, degrades overall system performance in two ways. First, it reduces available torque at the robot joints, especially for the wrist, for any given payload. If the distance is doubled the allowable payload is halved. If the distance is zero, the effect on wrist torque is zero. Second, it limits the size of the dexterous workspace, so that simple wrist rotations increasingly require increasingly exaggerated motions of the biggest, heaviest arm links. The greater this motion, the more joint-drive-power required, the more effort required to avoid collisions, and the lower the margin of safety. In the ideal case of zero distance, pure rotations cause zero motion of the larger links.

Expanding on the limitations of the robot wiring, robot structures have to be long and slender in order not to interfere with their tasks or themselves. The slenderness is limited by the complex joints which must both support loads with bearing sets and impart torques with mechanical drives. As a rule, robot manufacturers do not ship robots with externally mounted wires. Electrical wires can be routed on the outside of a robot by users, but with huge cost, because the robot ends up wrapping and unwrapping the wires around the structure as the joints rotate. The motion can require several meters of active service loop; and even then, a small snag or even capstan effect can instantly sever them. The only safe option is to route the wires internally, but the wires need to allow flexure along each sequential joint axis. Furthermore, to reduce fatigue, expensive cable ("robot cable") is installed with generous (volume-expensive coils) at each joint axis. The need to reserve free space at each joint axis for coils of wire, impacts the cost of the joint mechanisms severely, arguably creating the greatest single cost and performance impact on any robot, whether arm or hand.

"Practical" also involves interrelated considerations regarding industry-standard tool-plate location versus hand bulk versus wires. All major commercial robotic arms end in a tool plate that is located just after the wrist axes. The wrist and forearm of commercial arms are integral in terms of mechanical, electrical, software, control, and safety, and cannot be removed. They also cannot accommodate more than a couple air hoses or wires. The academic dexterous robotic hands include a large volume of motors and transmissions, typically directly behind the hand. Most researchers use these hands as tools to study machine manipulation without ever intending to mount their hand on the end of a robotic arm. While some researchers claim that their hands can be commercially viable, the usual suggestions are not in fact practical. One suggestion is of removing the arm's forearm and wrist and replacing them with an integrated forearm+wrist+ hand assembly of the researcher's design. However, the industry firmly rejects removing the forearm and wrist. Another suggestion is to mount the volume of motors and amplifiers at the base of the arm and to run wires all the way through the robot's joints. But each brushless motor in hand requires at least 3 heavy-gage power phase leads, a heavy-gage safety ground, and 4-7 position-feedback leads for commutation. Any other sensors (force, temperature, vision, tactile, etc.) require additional wires to be threaded down the entire robotic arm. Typically these hands require 50-150 support wires. Additional dexterity requires additional motors and therefore proportionally more wires. Clearly, there is a need for hand dexterity that is independent from the number of wires.

Because of these requirements of a practical hand, the single most common tool is a gripper with 2 or 3 jaws, which is sold with the aforementioned "softjaws" made of aluminum or machinable steel. With varying degrees of success, the integrator applies experience and intuition in a time-consuming, iterative process to design the jaw shapes that will secure target objects reliably. For every unique variation in object size, shape, or orientation, a new tool is prepared and a tool exchanger employed to switch between this and other tools. Since the robotic-arm manufacturers and the tool integrators presently are independent business entities, the tool is designed as a self-contained module ready to be fastened to a tool plate or tool-exchange adaptor. Since the tool is located at the far end of the robot from its base, any tether for pneumatic, hydraulic, or electric control should be thin enough to fit (with other tethers) through restricted channels along the robot structure; flexible enough to face millions of flex cycles around multiple axes without fatigue failure; and robust.

The tether restriction limits the amount of sensor or control bandwidth that can be supported between the arm base and the tool.

The tool is attached at the end of a robotic mechanism capable of transporting the base of the tool with precision. (Whole-Arm Manipulation as described in U.S. Pat. No. 5,207,114 is the only case known to applicants in which other parts of the arm interact physically to achieve tasks.) Also, lasers, water-jet cutters, dispensers, and arc-welders do not make hard physical contact with the task, but they are nearest to the task and their trajectory controls the quality of the task. While the robotic transport mechanism is far bigger and more expensive than the tool, its only role is transportation of the tool. Otherwise the arm's own bulk obstructs valuable workspace, blocks access to the work piece, and introduces the dominant safety hazard. Tools, such as robotic hands, are part of a much larger system, such as a workcell (see FIG. 1), which exists mainly to impart intelligent motion at the base of the tool. Typical system components include:

- an articulated robotic arm, with joints driven by electric motors
- a set of motor-power amplifiers, normally mounted near the base of the robotic arm
- a motion-control processor which coordinates the arm motor velocities
- a processor to which the sensors report and which coordinates system activities
- the object work piece on which the system operates to perform a task
- various electronic sensors, measuring contact, vision, proximity, temperature, etc Typically one of the dozen or so multinational robot manufacturers provides the components that are readily mass-produced, including the arm(s), amplifiers, and motion-control processor(s). Then an integrator works with the end-user to specify sensors, customize the end-of-arm tool(s) for a specific task, and program the system. When multiple tasks are requested of a robotic system or there is significant variability in the task, then separate individual tools are customized and exchanged with a tool-changer for each part of the task. Individual tools are kept therefore on racks within reach of the arm. Since the tool customization process usually involves time-consuming machining, duplicate spares for each unique tool are kept in local inventory to minimize production down durations in case of a tool failure. In general, the more complex the task(s), the greater the reliance on both tool variety and sensor input.

It is easy to overlook the importance of the tool, given that it traditionally makes up roughly only 1% of system cost and 0.1% of system weight and has a level of sophistication amounting to one bit of control—full-open versus full-closed in the case of grippers.

A practical dexterous robotic hand would have many obvious and many subtle advantages over less-dexterous grippers. Mean-time-between-failures (MBTF) is a good example of a subtle, even counter-intuitive advantage. At first glance one might assume that MTBF of simple, low-part-count grippers would easily beat complex, dexterous hands. But grippers have no control or sensing, so their action runs full speed into mechanical stops on every cycle, concentrating failure there.

By contrast, if a hand is dexterous and intelligent through sensors and controllers, MTBF is not nearly as important as the standard deviation of MBTF. That is, it is far more important to know precisely when a particular unit needs servicing than to make the average time very long.

Another disadvantage for dexterous hands generally—as compared to grippers with pre-shaped gripper-jaw geometries—that goes counter to conventional wisdom is that dexterity does not provide position information to the same level as gripper jaws with limited motion and geometric locating features formed on the jaws of the grippers. A gripper (with shaped jaws) is programmed to pick up the same part at the same pick-up location over and over. As long as the part position error just before gripping is within the chamber size of the gripper jaw's geometric feature(s), then the part will adjust its location to fall precisely into that feature. The net result is that the act of gripping the part reduces its position error. This does not occur with known, academic dexterous hands.

In contrasting known dexterous hands to known grippers, it is also important to note the end-effector, aka the tool, of a robotic arm faces the greatest extremes of any robotic system. The extreme location of end effectors at the tip of the robotic arm has four consequences.

1. It is usually the first part of the robot to make impact with obstacles.
2. It is the fastest moving part of the robot.
3. It is nearest part of the robot to the extreme conditions that necessitated the use of a robot in the first place, like the pelting of molten weld splatter.
4. More than any other part, its mass (and that of any additional payload) requires a disproportionate fraction of joint torque.

With or without machine-vision, robot arms crash end effectors into immovable obstacles. Most frequently, the immovable obstacle is the target payload or task itself. Errors in robot trajectories during programming and misplaced payloads after programming are the usual culprits. Generally, it is expected that the end effector will be designed to withstand these impacts or be easily (and cheaply) replaced. These considerations have also deterred the adoption of dexterous hands for commercial applications. In short, known dexterous hands are not practical.

SUMMARY OF THE INVENTION

A robotic device has a base and at least one finger having at least two links that are connected in series on rotary joints with at least two degrees of freedom. An actuator, such as a brushless motor, and an associated controller are located at each joint to produce a rotational movement of a link. Wires for electrical power and communication connect the controllers in a distributed control network. A network operating controller coordinates the operation of the network, including power distribution. At least one, but more typically two to five, wires interconnect all the controllers through one or more rotary joints. Motor sensors and external world sensors monitor operating parameters of the robotic hand. The electrical signal output of the sensors can be input anywhere on the distributed control network. The device is self-contained in that the actuators, sensors and controls are all on the device itself. This device is also practical.

On one form, the invention is defined broadly as a self-contained, practical robotic device energized by a power source and adapted to manipulate objects which includes a base, at least one finger mounted on said base having at least first and second links rotatably connected in series to one another at a rotary joint and connected at a proximate end of said first link to the base, said at least one finger having at least two degrees of freedom associated with at least two of said rotary joints, comprising an actuator mounted on said robotic device at each said rotary joint and operable to move an associated link about the associated one of said rotary joint, an electronic controller located proximate each of said actuators to control and power the associated one of said actuators, wiring within said robotic device that connects said controllers and said associated actuators to the power source and interactively connects said controllers to one another on a shared bus to form a distributed control network, and a network operating controller interactively connected by said wiring to all said actuator controllers, said network operating controller coordinating the operation of said actuators through said distributed network of said actuator controllers.

In other forms, V-grooves on the robotic hand locate objects precisely and assist in gripping. The hand is sealed, immersible and has electrical connections through the rotary joints for anodizing in a single dunk without masking. In various forms, this intelligent, self-contained, dexterous hand, or combinations of such hands, can perform a wide variety of object gripping and manipulating tasks, as well as locomotion and combinations of locomotion and gripping.

The invention includes a process for anodizing the device in a single immersion, without premasking. This process, broadly stated, is defined as one for anodizing a robotic device having structural components rotatably connected to one another at rotary joints, the robotic device having an outer housing formed of an electrically conductive material that forms at least one interior cavity that contains electrical components of the robotic device, comprising providing anodizing solution, sealing the exterior of said housing to prevent a flow of said anodizing solution into said at least one interior cavity when the device is immersed in said anodizing solution, electrically connecting all of the exterior structural components of the robotic device, including the rotary joints, immersing said sealed and electrically connected robotic device in said anodizing solution, and applying an electrical current through the solution and the immersed robotic device to effect an anodizing of all the exposed exterior surfaces of the robotic device without a pre-masking of the robotic device.

DETAILED DESCRIPTION OF EMBODIMENTS OF THE INVENTION

Figure 1:
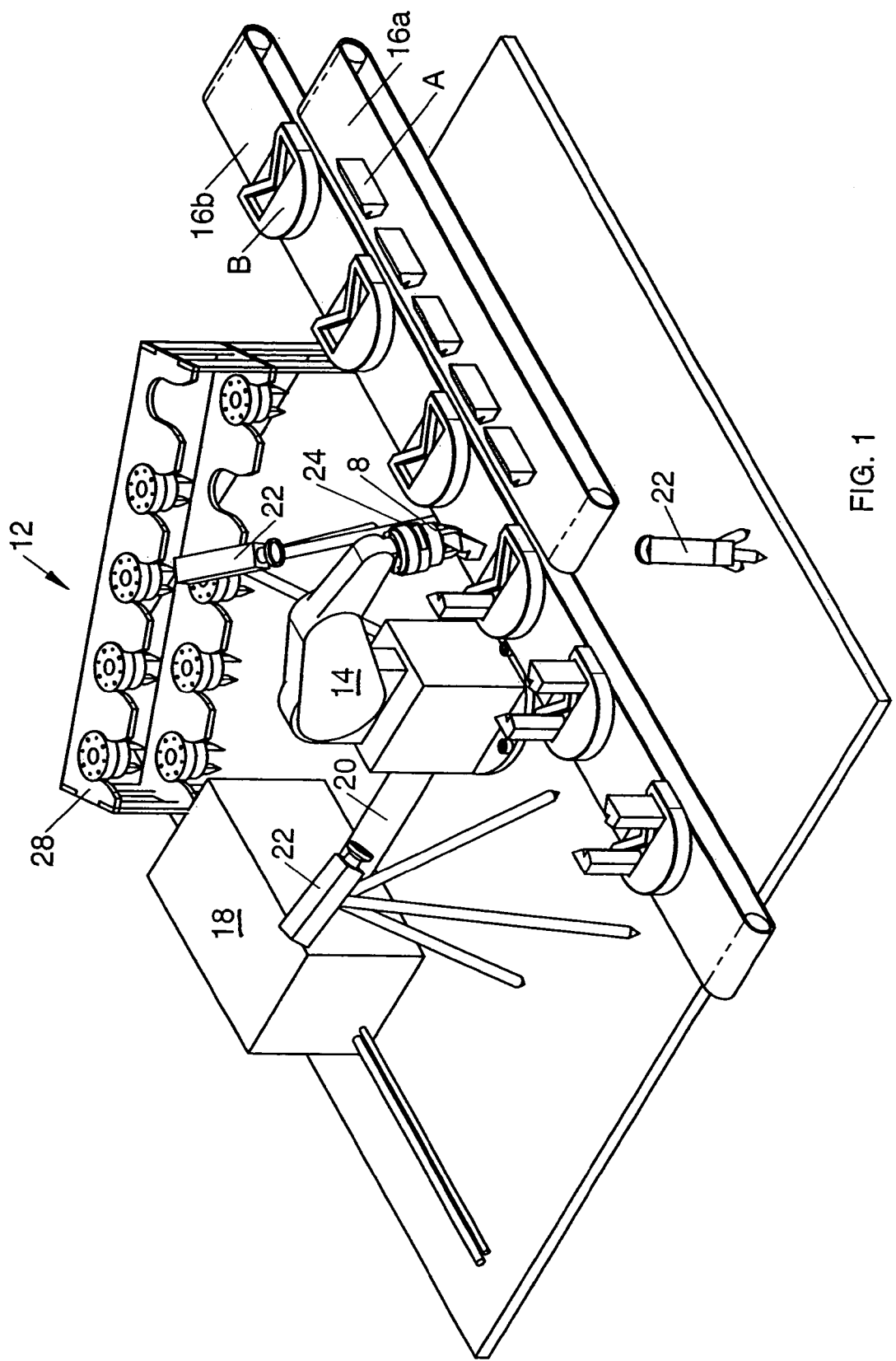
FIG. 1 is a view in perspective of an exemplary prior art workcell where a robotic arm and tool manipulates and assembles components using tools held within a workcell on a tool rack and with the assembly guided by a vision system including multiple remote cameras.

In existing practical robotic systems such as the workcell shown in FIG. 1, the intelligence and dexterity are concentrated around the static workcell area 12 and on the robotic arm 14 or other moving platform that supports a prior art tool 8, but never at the tool itself. While several intelligent and dexterous research-prototype robotic hands have been built in order to emulate human hand motion or to study the mathematics of multi-fingered manipulation, these devices are not designed to make a complete system more useful for completing practical tasks. For example, in order to design such a hand, either the hand is not compact or the sizable electronics are located outside the hand. As a result, applicants are not aware of any being used in a commercial application.

The tool 8, which comes in direct contact with the task, here the assembly of parts A transported on conveyor 16A to one of parts B transported on conveyor 16B moving in the opposite direction, is merely a peripheral. Control is centered remote from the tool 8 and arm 14 in a control box 18 connected to the arm and tool by a bundle 20 of power and communication wires. Remote cameras 22, 22 provide vision guidance for the operation of the arm and tool. Vision is limited by obstructions in the line of sight to certain locations.

Figure 2:
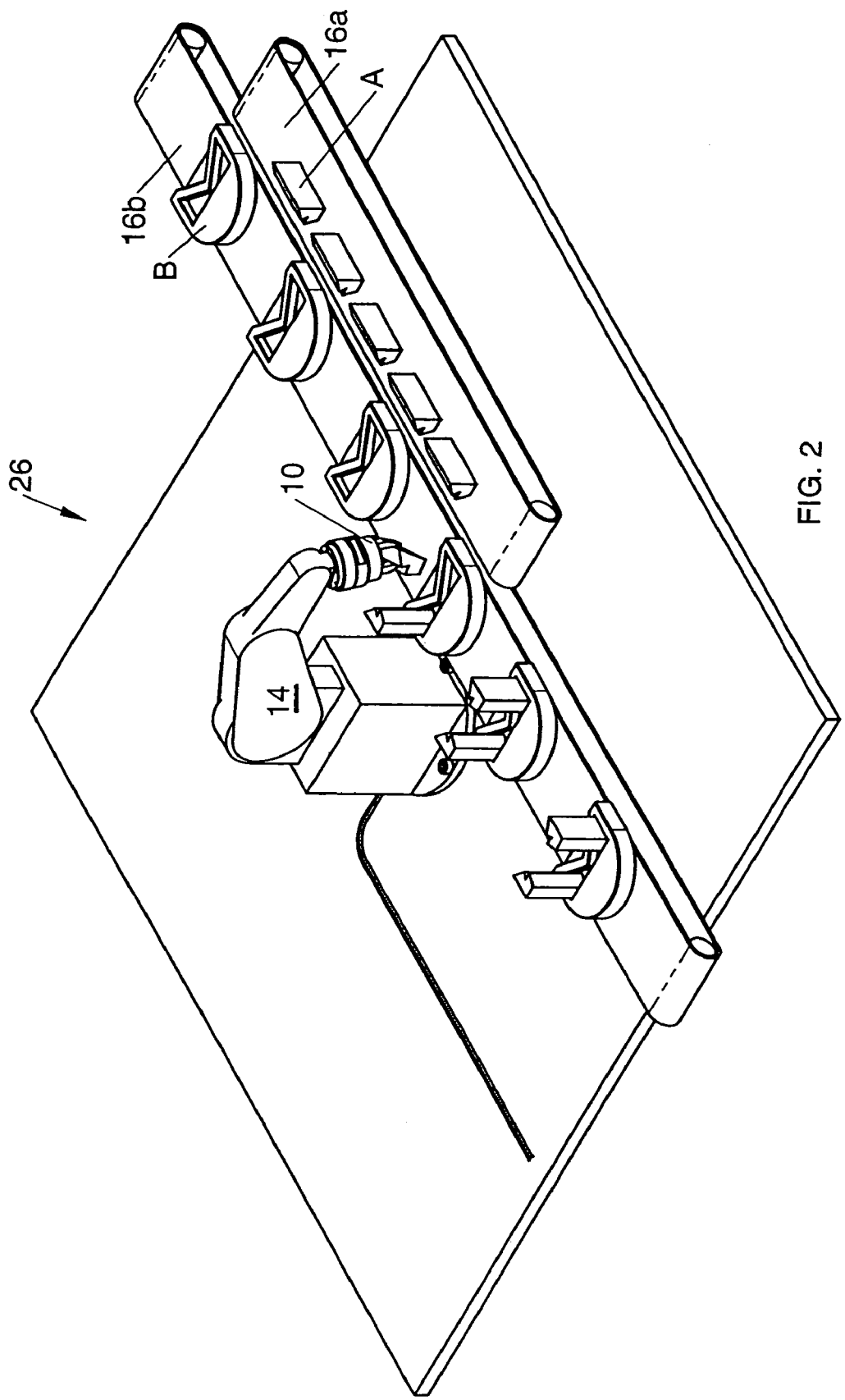
FIG. 2 shows a comparable workcell utilizing a robotic hand according to the present invention.
Figure 3:
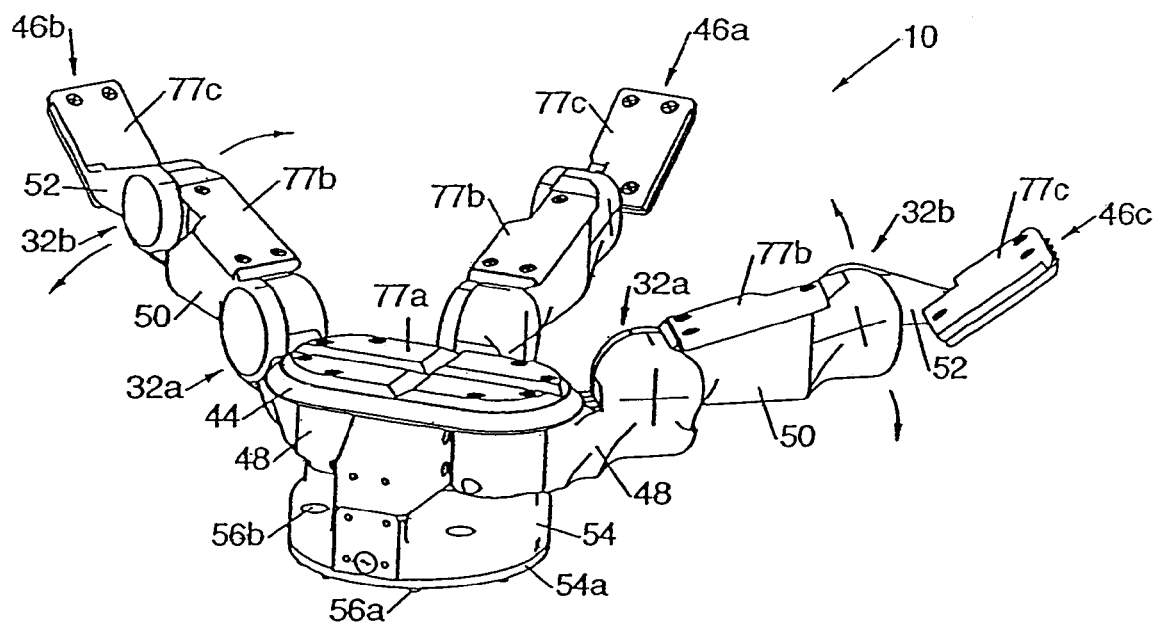
FIG. 3 is a view in perspective of a three-fingered robotic hand according to the present invention shown with two fingers rotated to an open position.

FIG. 2 shows a robotic hand 10 according to the present invention that, like a conventional gripper tool 8, replaceably mounts on a tool plate 24 secured at the end of the robotic arm 14. However, the workcell 26 in FIG. 2 has no control box 18, no wire bundle 20, and no remote cameras 22, 22.

The robotic hand 10 of the present invention radically reorganizes robotic systems by moving all or some of the intelligence, dexterity, and sensor capability out to the tool itself, resulting in a tool-centric system. To do this, high intelligence, dexterity, and sensors are concentrated at the tool, shown here as the robotic hand 10. In this new model of robotic systems, the workcells, robotic arms, and mobile platforms become the peripherals. The hand 10 is practical and sophisticated. Note that the sophistication of hand 10 allows the elimination of a tool changer with attendant significant cost savings, and may reduce the number of tools in the tool rack 28 (FIG. 1). Herein, the robotic hand 10 may also be referred to as a tool or device. Also, the same reference number is used for like parts in different embodiment.

The articulated structure of the robot arm and hand places a high cost on physically routing signal wires, and therefore on communications bandwidth. This difficulty militates strongly against placing sensors S, especially bandwidth-intensive vision camera(s), at the tool. (Infrared and radio communications are bandwidth-challenged, especially in noisy and occluded environments.) The same reasoning discourages giving the tool or hand too much dexterity, the motors of which would have to be remotely powered from the base of the robotic arm.

The robotic hand 10 is organized directly opposite to the conventional wisdom—it is hand-centric. This characteristic is a high level definition of the present invention. This hand-centricity derives from localized actuators 30 for each joint 32 of the hand and a distributed, interactive control architecture 34 that places control, at least in part, at each actuator in a control module 36 termed herein a "puck" due to its presently preferred hockey puck-like outer configuration. The control architecture includes a central "NOD" controller 38. Each puck includes a controller 40, termed herein "TATER", that interactively communicates with the NOD controller 38 and other TATERS 40 at other joints 32. Each TATER controller also communicates with an associated controller 42 for the associated actuator 30. In the preferred form shown, the actuator is a small D.C. brushless motor, and the controller 42 produces commutated drive signals for such a D.C. brushless motor, and is termed herein a "FET" controller.

With particular reference to FIGS. 7-11, communication is preferably via a CAN bus protocol that conforms to known ISO standards. As will be discussed in greater detail below, the basic TDMA, 8 byte packet protocol of CAN, operating at, e.g. 1 MHz, has a higher level program (HLP) overlaid to provide a communications language for the hand control system.

Power is supplied via a 2-wire line with an optional third line for a safety ground. It is D.C., preferably at 24 volts, but can adapt to other voltages such as 42 volts or 48 volts. Maximum current is presently recommended as 20 amperes for each hand 10. The CAN bus 82 is implemented using 2-wire communication, so that only four wires W need be routed to power and control the entire network. It is also contemplated that the communications signals can be carried on the power lines as a carrier, thus reducing the power and communications to a two-wire system. It is also possible, although not preferred, to use the metallic structural components of the hand 10 electrically connected through the rotary joints as a common electrical ground line, allowing use of only one power and signal wire. It is also significant that the hand 10, which has nine segments, has segment-to-segment electrical connection through the joints. This is important for controlling electrostatic discharge, isolating electromagnetic noise in the workcell from the robot control, and permitting single-dunk, unmasked anodization discussed below.

Turning to the construction of the hand 10 and its kinematics, the general configuration, a palm plate 44 and three fingers 46, each with three links 48, 50 and 52 and two joints 32a and 32b, is of the general type described in U.S. Pat. Nos. 4,957,320 and 5,501,498 to Ulrich. One finger, 46a here, is stationary with respect to movement in the plane of the palm 44. The fingers 46b and 46c are articulated at a base 54 to rotate about parallel axes, to "spread" the fingers. This general design is dexterous, capable of gripping, grasping, and manipulation of a wide variety of objects. (The actuation of the fingers described in the Ulrich '320 and '498 patents is by cable transmission from one drive per finger, and electronic control is centralized and remote from the joints.)

In the robotic hand 10 of the present invention, all axes of articulation are driven by dedicated, independent motors, except the spread action of fingers 46b and 46c which can be driven by either two independent motors or, as shown, one motor 30a which couples both spread axes so that they spread synchronously around the palm 44. In this second mode they are as described in the Ulrich '320 and '498 patents.

The hand 10 is 8 axis, with one spread axis and two controllable joints per finger. The spread range is 180°. The inner finger joint 32a rotation range is 140°, and the outer finger joint 32b rotation range is 270°.

By way of illustration, but not of limitation, the fingers 46a-46c each have a length of 330 mm, and the base has a diameter of 150 mm. The hand width is 192 mm, the height is 115 mm, and its total weight is 7.5 kg. The grasp force at a fingertip is about 100N, and the static payload for three fingers is 120 kg.

Figure 4A:
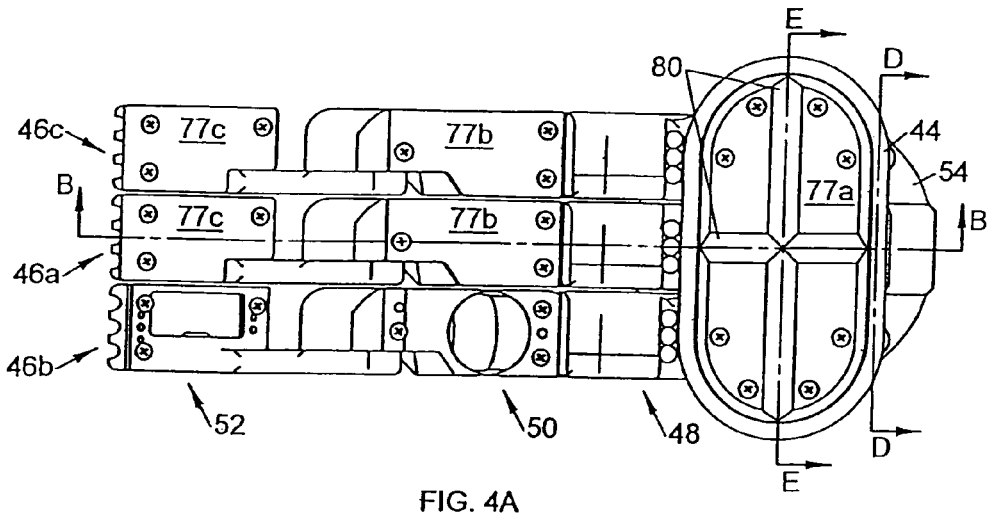
FIG. 4A is a top plan view of the robotic hand shown in FIG. 3 with all three fingers shown in parallel alignment and with the finger links rotated to a position generally coplanar with an opposed palm plate.
Figure 4B:
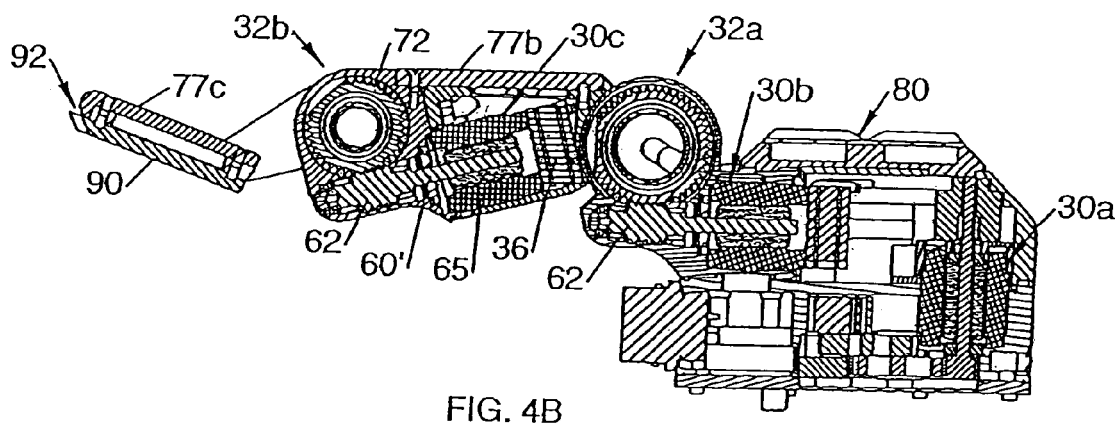
FIG. 4B is a views in vertical section taken along the line B-B in FIG. 4A.
Figure 4C:
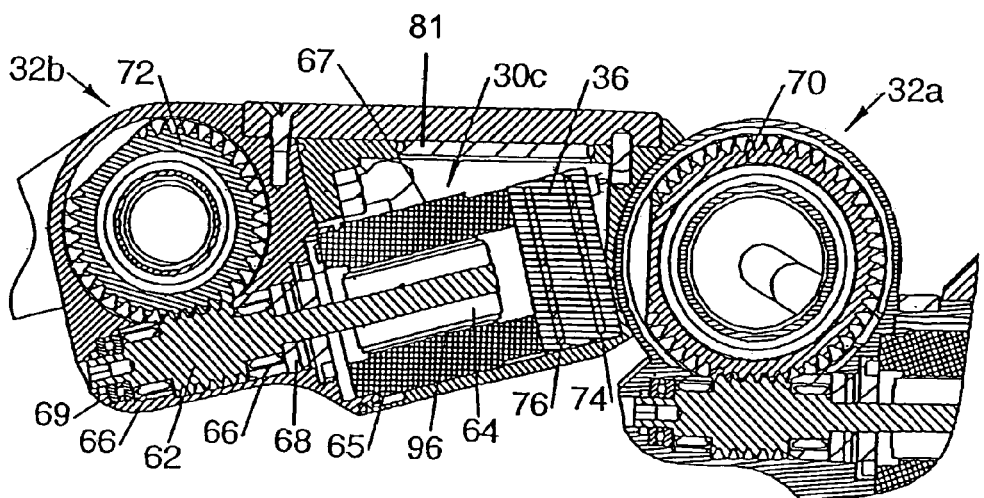
FIG. 4C is an enlarged view of the second link in associated articulated joints as shown in FIG. 4B.
Figure 4D:
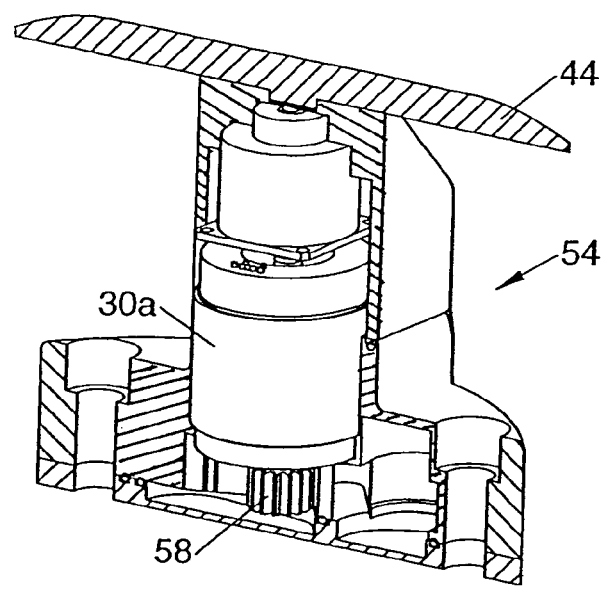
FIG. 4D is a view taken along the line D-D in FIG. 4A.
Figure 4E:
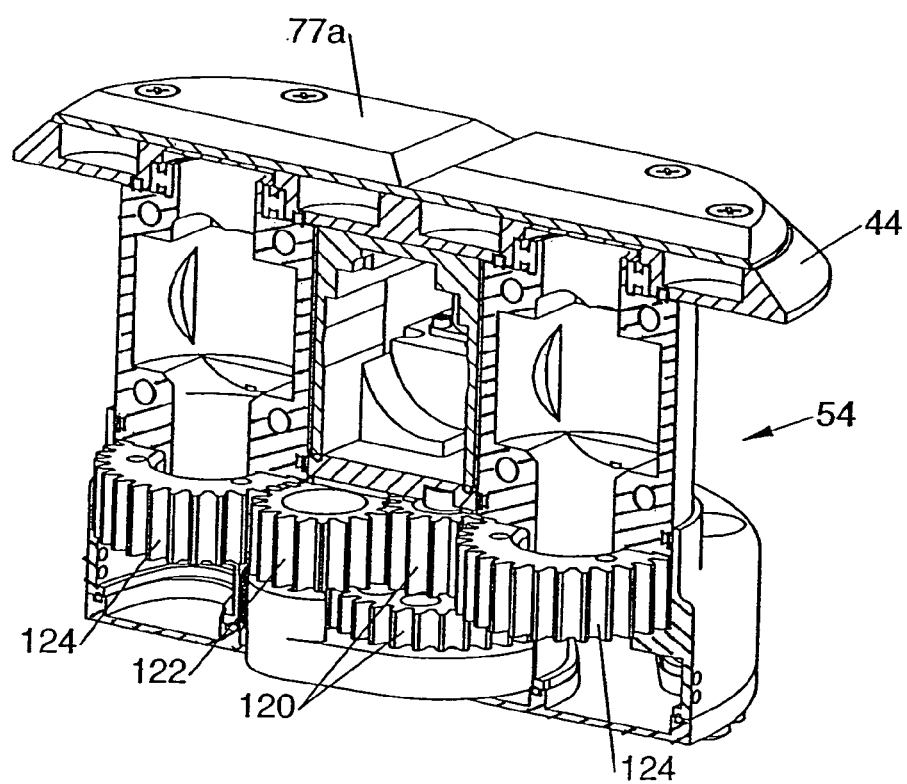
FIG. 4E is a view taken along the line E-E in FIG. 4A.
Figure 5:
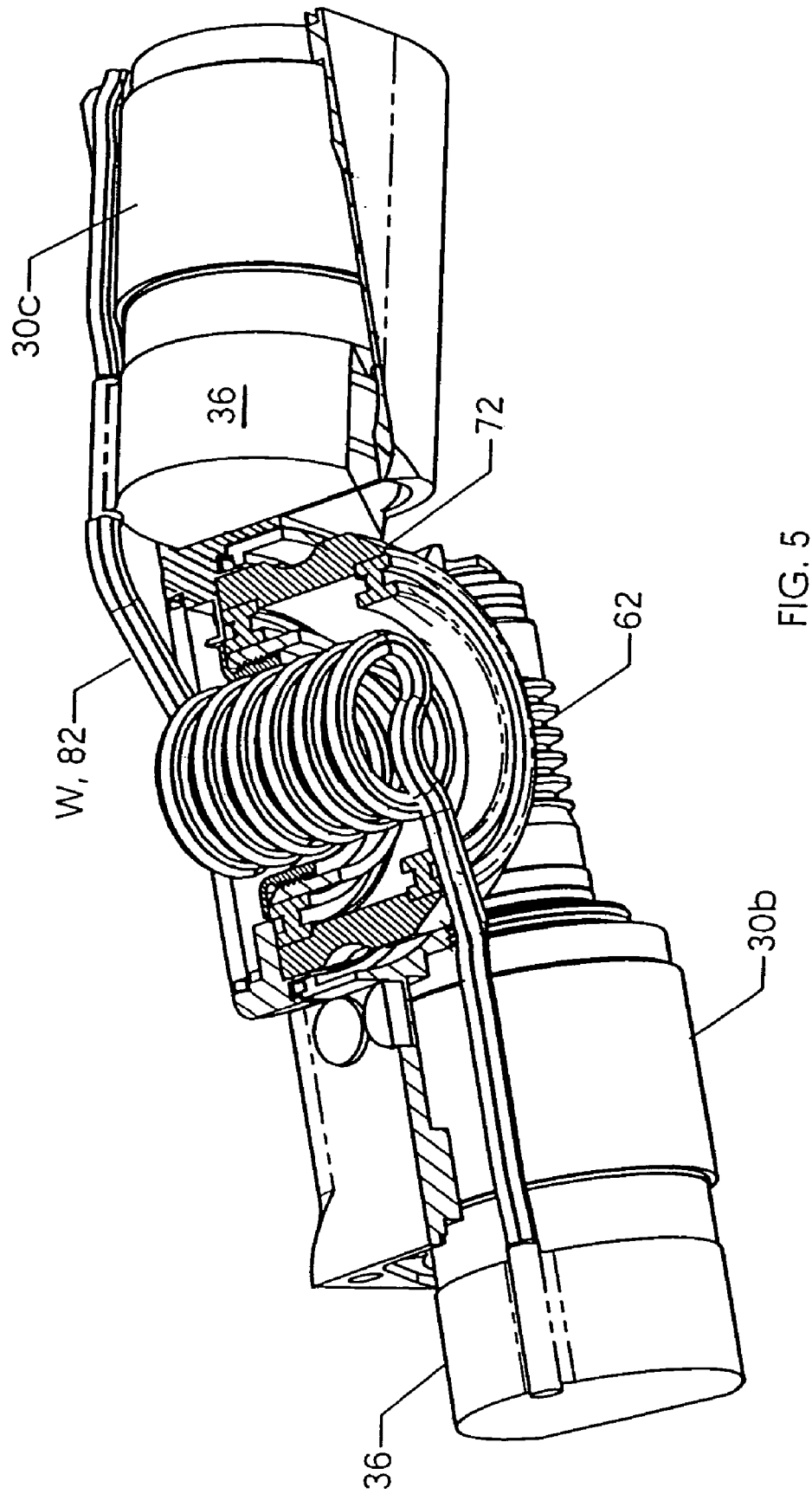
FIG. 5 is a detailed view in perspective, with portions broken away, of the rotary joint and associated motors, controllers and through-joint wiring of the joint shown in FIGS. 4A-4C between the first and second links of a laterally movable, or "sweep" finger.
Figure 6A:
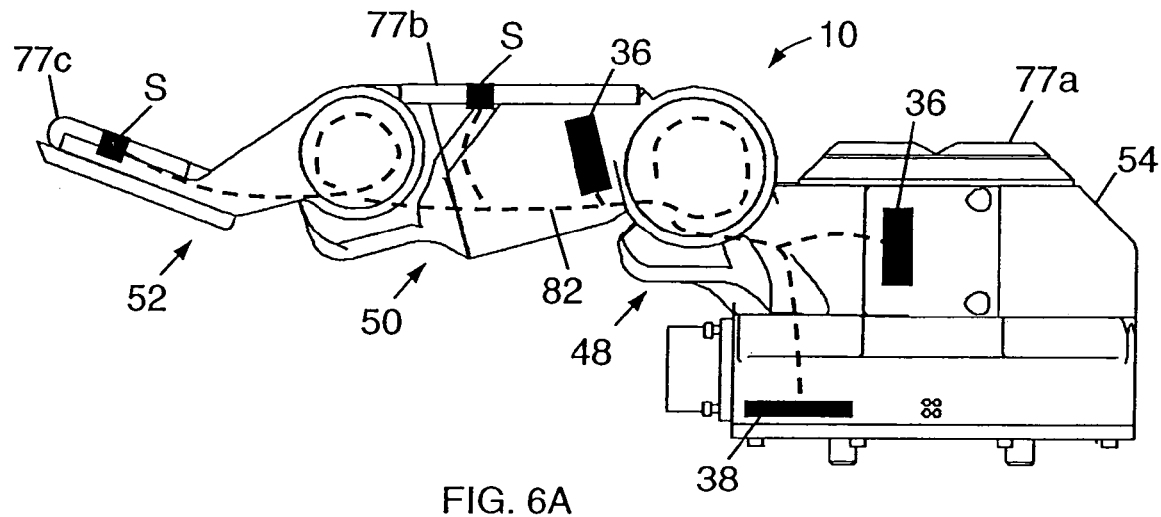
FIG. 6A is a simplified view in side elevation of the robotic hand of FIGS. 2-5 showing the physical location of the controllers and sensors.
Figure 6B:
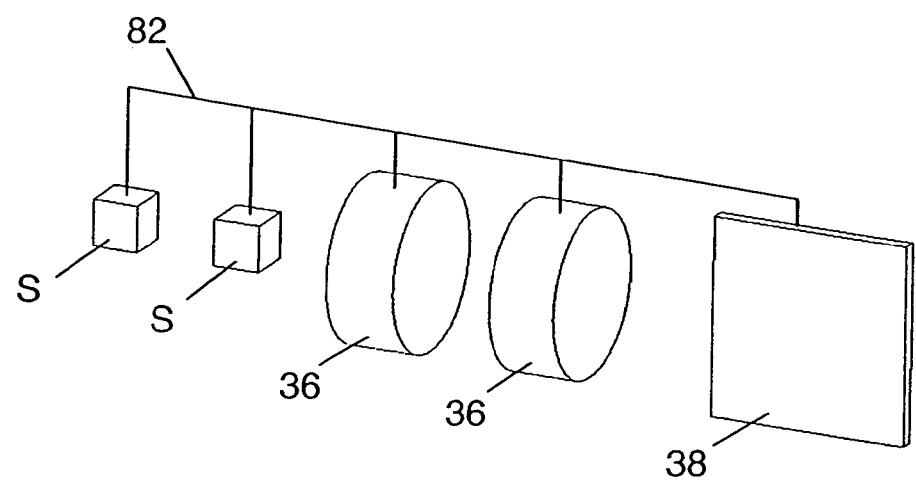
FIG. 6B is a schematic view of the distributed control architecture shown in FIG. 6A.
Figure 7:
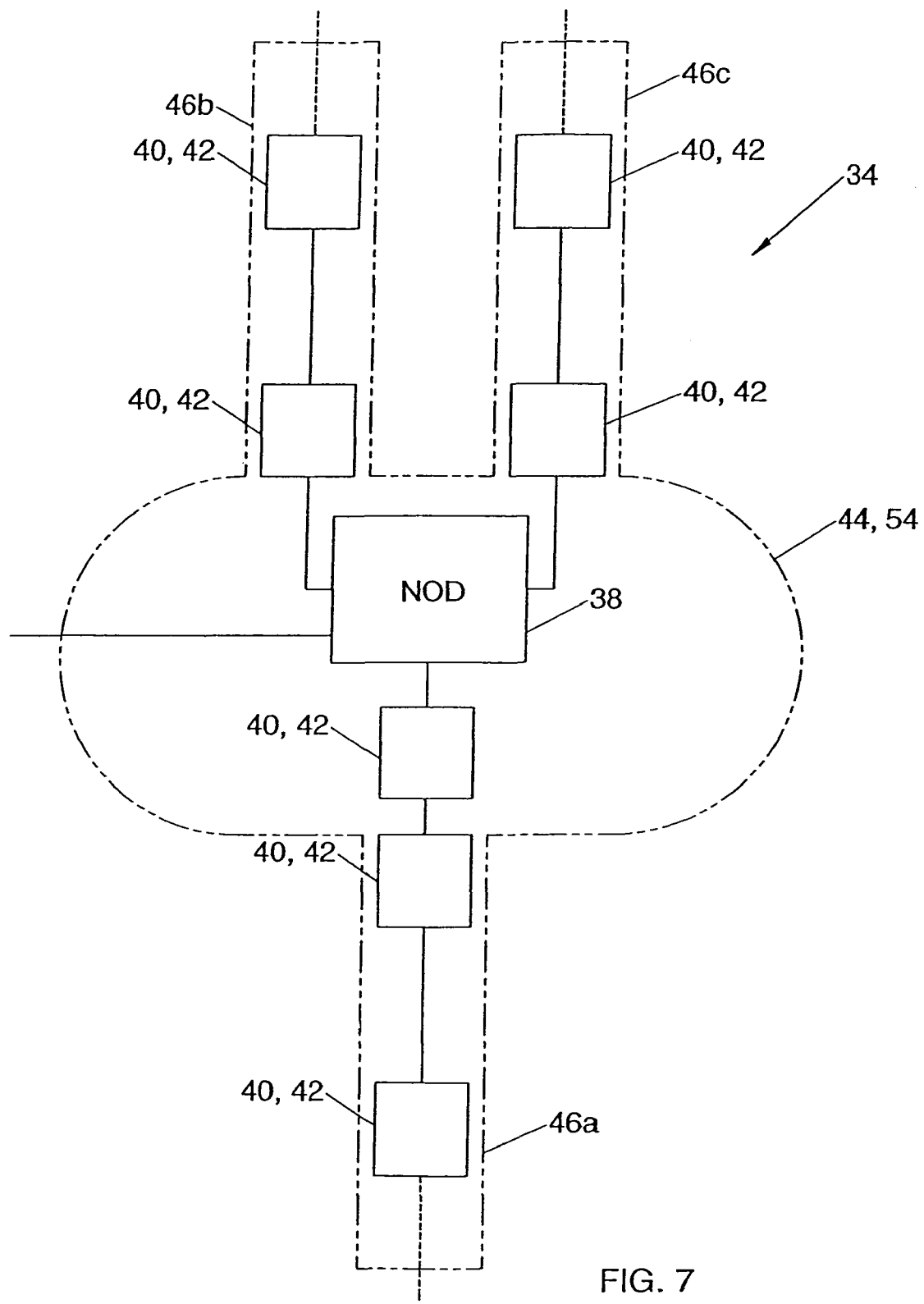
FIG. 7 is a schematic diagram of the control system architecture of the robotic hand according to the present invention and as shown in FIGS. 3-6B.
Figure 8:
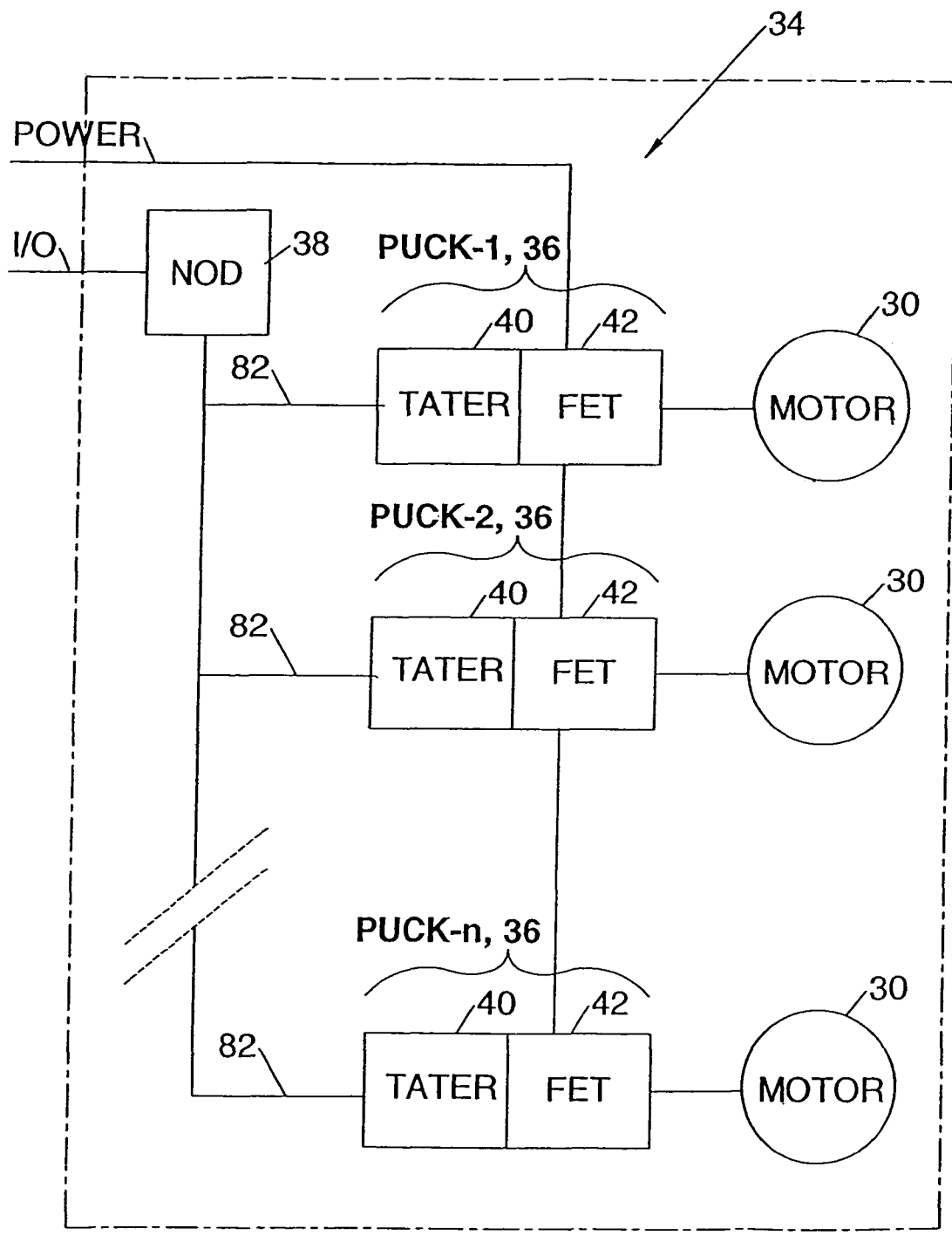
FIG. 8 is a more detailed schematic diagram of the control system architecture shown in FIG. 7.

The hand 10 contains all motors, sensors and all controls, servo and supervisory. Base plate 54a is adapted with pins 56a and holes 56b to mate replaceably with a tool plate 24 or the like. However, the hand can be stationary, e.g. to function as an intelligent fixture or clamp on a machine tool for a part being machined. The base houses the D.C. brushless motor 30a that has an axis of rotation orthogonal to the base plate 54a and the palm plate 44. A pinion 58 (best seen in FIG. 4D) is mounted on the rotor shaft 60. It engages a gear train—consisting of a reduction gear pair 120, an idler gear 122, and two output gears 124, 124—that produces the coordinated spread movement of fingers 46b and 46c. In each finger, motor 30b drives the rotation of "inner" joint 32a, and motor 30c drives the rotation of "outer" joint 32b. A miniature 3-phase D.C. brushless motor with rare earth magnets 64 of samarium cobalt alloy is preferred. Three pairs of N-S magnets of bread loaf design are typical. The basic motor can be obtained from manufacturers such as Kollmorgen. These motors are small and light. They develop a high torque with good efficiency. They have a low inertia and are very responsive. The motor can have a maximum outer diameter of 1¼", which is compatible with it being placed within a link.

The finger motors 30b and 30c are customized with a rotor shaft 60' that has an integral worm gear 62 formed at its output end exterior to the motor housing 67. The motor coils are stationary in a stator 65. The magnets 64 are mounted on the rotor with a slight air gap to the stator 96, e.g. 0.015 inch. It is important that there are no bearings within the motors 30b and 30c. The rotor is supported and mounted in a spaced relationship within the stator by external needle bearings 66, 66 and secured axially by an external thrust roller bearing 68 and thrust ball bearing 69. The load of the interaction between the worm and a gear 70 for joint 36a is radial to the rotor, and opposed by the needle bearings, or equivalent ball thrust bearings. The absence of brushes and internal bearings eliminates friction and enhances the performance of the motor. This arrangement also allows a "drop in" assembly of the motor and the associated bearings. An interference friction fit at the needle bearings holds the proper alignment of the rotor shaft when loaded radially.

The worm gear 62 and entrained gear 70 provide a significant reduction gear ratio. As an example, a determination of the position of the rotor 60, 60' within 20° can provide a precision in the motion of the link secured to the gear 70 of about 0.5 degree. It is also significant that if a link is blocked, or power is cut off, the rotor locks in position provided the worm gear 62 has a worm pitch angle on the order of a few degrees, e.g. 5°±2°.

The motor 30c has a like construction and like mode of operation to drive the outer finger joint 32b through an associated gear 72. The responsiveness of this drive and transmission is such that the hand 10 can reconfigure in about 100 milliseconds.

Each motor 30 has associated with it, and positioned immediately adjacent to the associated motor, one of the pucks 36. The puck 36 includes circular P.C. boards 74 and 76 in generally parallel spaced relation potted in a conventional resin with good thermal conductivity that is electrically insulating. Board 74 generally corresponds to the "TATER" controller and board 76 is the FET controller board. Independent actuators and control are therefore provided at each controllable articulated joint (with the spread motor 30$a$ and its associated puck providing synchronous spread for two fingers). The TATER board 74 has a digital signal processor or microprocessor. DSP Chip Model TMS320 LF2403A manufactured by Texas Instruments is one exemplary suitable such chip. A similar chip can be used to implement NOD 38.

The housing for the hand, including the base and all finger links, is preferably aluminum, more specifically grade 7075-T6. Metals are commonly used instead of composites and plastics in order to survive severe physical impacts and extremes in temperature. Aluminum is lighter than steel. And, unlike steel or any other modern structural metal, it accepts the anodize. Anodize coating protects the aluminum from scratches and other physical damage by chemically converting the metal surface into a hard ceramic about a mil deep. But unlike pure ceramic, the Teflon® impregnated material remains resilient and ductile rather than shattering upon impact. The anodize layer also protects the exposed surfaces from a wide array of caustic chemicals and prevents galling—contact welding of identical materials—between press-fitted bar aluminum surfaces. When tiny fragments of Teflon® are trapped in the ceramic matrix during the anodize process, the Teflon®-impregnated surface is able to shed weld splatter and other contaminants.

In the anodize process it is difficult to control the thickness to better than half a mi. This tolerance is unacceptable for the required press and clearance fits of roller-bearing races, which almost always require tighter than ½-mil precision. Because races are made of steel, there is little danger of galling upon installation if no anodize is present. Therefore, it is standard to mask the bearing surfaces with a temporary coating that locally excludes anodization and can be removed after the anodize process. Masking material is carefully applied with a paintbrush by a craftsman who follows special instructions from manufacturing drawings. This process has almost no economy of scale, so it is always expensive, even in production manufacturing.

While the tolerance stack-up in an assembled robot due to anodize tolerance variations is not the driving precision factor, the presence of anodize material between aluminum structural pieces does create grounding issues. It is important in any robot that electrons in the bulk material can move unimpeded. Anodized surfaces are electrical insulators and their presence between assembled structural pieces causes a list of electrical problems, including ground loops, reduced shielding of electrical noise, and the danger of electric shock. Conventional masking of these individual mating surfaces further increases the manufacturing cost of the robot.

Because robotic arms and robotic end effectors should withstand environmental extremes, the robot design of the present invention seals the structure from liquid penetration. The aluminum exterior is anodized, and preferably Teflon® anodized, completely. A significant advantage of the hand 10 is that it is sealed, immersible and electrically connected through the joints. Instead of costly and tedious masking, the entire unit can be immersed in the anodizing tank. An outer anodized coating 0.001" thick is typical. As a corollary, the hand 10 can be immersed in end-use, e.g., for retrieving objects from water or from a tank of a liquid.

The method of anodizing robots of the present invention eliminates the high cost of manual component masking by first assembling and then anodizing the entire robot (or just the outer structure of the robot) in one operation. To obtain the best results, the robotic unit is sealed from liquid. Also, large variations in the temperature of the acid and rinse baths used for anodizing can cause high pressures to build up and breach the seals. The baths are therefore preferably at similar temperatures. Test runs should be made to validate the procedure. Further, it is best to install ground straps across the joints to ensure good conduction to all surfaces.

Well-designed end-effectors minimize the number of exposed screws. For those that are exposed, it is critical to replace them temporarily with either aluminum or titanium fasteners. (Titanium is not affected by the anodize process.)

At the joints, it may have been necessary to create tight clearances between surfaces. The resulting crevices can prevent the anodize chemicals from penetrating to these surface areas. The process of anodizing requires that as anodize is built up on the external surfaces of an aluminum part, the voltage required to drive the anodize process is progressively increased to very high levels. If one of the joints shifts and suddenly exposes bare aluminum, the high voltage can cause a catastrophic burn-through explosion, destroying the robot. Immobilizing the robotic joint before anodization prevents this problem. Another technique that may control burn-through is to move the joint slowly during the process.

The palm and fingers carry replaceable gripping pads 77$a$, 77$b$, 77$c$ and can also mount a wide variety of sensors S and tools, as well as various pads. The middle finger, links and palm pads cover recesses with access to power and communications that can house the sensors S and tools (e.g. a gripper at the end of a finger or fingers). Other locations on the hand are, of course, possible. The sensors S include proximity sensors, load cells, temperature and radiation sensors, vision sensors, motor current sensors, motor position sensors, torque sensors, and many others. In a particularly powerful implementation that greatly enhances the hand-centric quality of the hand 10, a miniature camera chip can be mounted on a finger to provide localized, non-obstructed vision on the hand, as opposed to remotely, as shown in FIG. 1. Suitable such camera chips are under development at the Ishikawa Laboratory of the University of Tokyo. They are 64/64 pixel, with an approximate size of 1 cm×1 cm. Transistors at each pixel detect photons. The chip can include signal processing circuitry that determines the coordinates, centroid, and general physical properties of an observed object. The output can interface with the control system of the hand. When mounted on a hand 10, this miniature camera can provide a dedicated, self-contained, vision control for the hand. A miniature camera of this type, or a more conventional camera, can also be mounted on other parts of the hand, or a platform for the hand. The "blind" spot on the base directly opposite the fixed finger 36$a$ is one such location.

As shown, covers 81 are "man-hole" like discs of aluminum that engage the sidewalls of the recess through an O-ring seal. The mating sides have a small bevel. The cover can be removed with a suction grip. When covered and sealed, the recesses and electrical connections therein are isolated from anodizing baths or other atmospherics. They promote immersibility.

Figure 12:
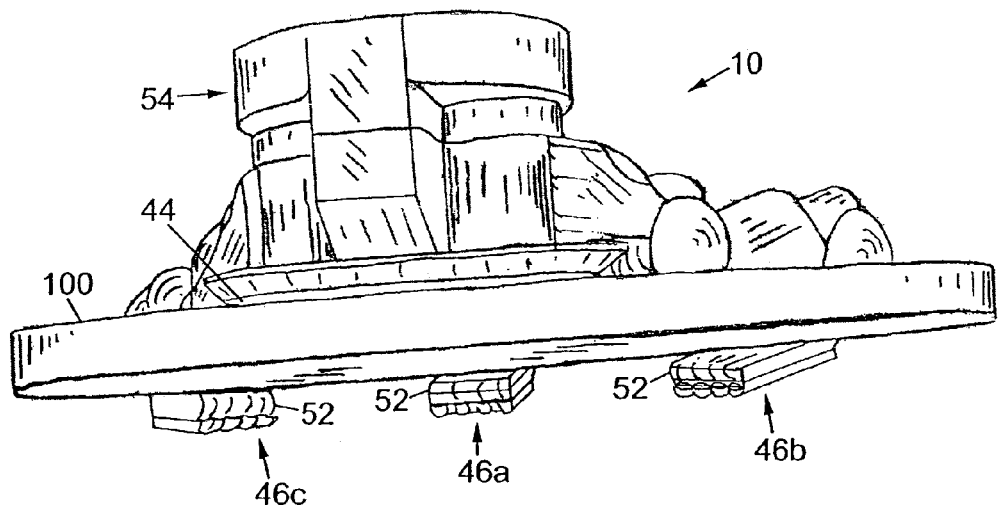
FIG. 12 is a view in perspective of the robotic hand according to the present invention and shown in FIGS. 2-11 with its three fingers gripping a sheet of material between the fingers and a palm plate.
Figure 13:
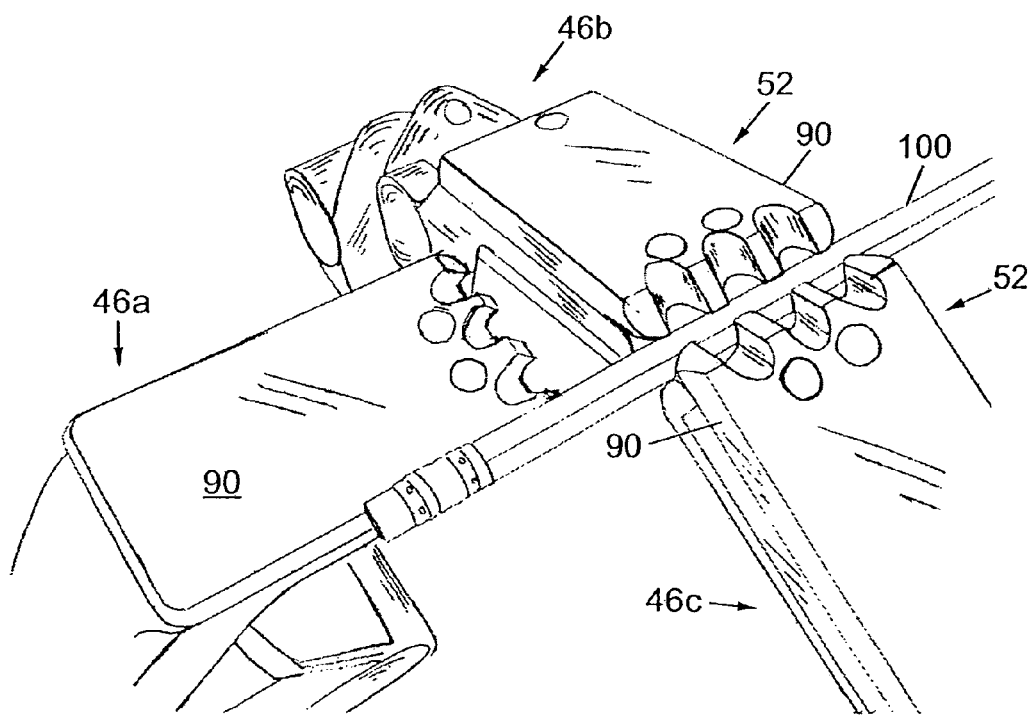
FIG. 13 is a perspective view of two opposed fingers of the robotic hands of the present invention equipped with fingernails and having V-groove gripping capability at the fingertips to secure an elongated object, a pencil as shown.

The pads 77$a$, 77$b$, 77$c$ are secured with screws that thread into the hand housing. If not removed in favor of a sensor, the pads can be readily changed to accommodate a particular application. V-groove gripping, for example, is facilitated by the crisscrossing V-shaped grooves 80 in the palm pad as shown. Like V-grooves in the fingertips are shown in FIG. 13 as useful in grasping and aligning an elongated object, here a pencil. The accessories can include "fingernails" 90, that is, chisel-like implements secured to the top of the outer link 52 that can greatly facilitate lifting objects such as sheet materials. FIG. 12 shows the dexterity and wide range of motion of the hand 10 used to grasp a sheet-like object between the palm pad and finger pads.

We define "Vingers" as precisely defined shape on the surface of a dexterous grasper, but most commonly a V-groove, that reduces the number of possible stable geometric locations and orientations of a target object that is to be grasped. This geometric feature may be on the inside or outside of any finger digit, at the fingertip (fingernail), or on the palm surface.

Apart from robotics, V-block fixtures are commonly used in manufacturing to locate and secure metal parts for milling, grinding, and drilling. Robotic grippers also frequently use special geometries and especially V-block-like geometries which adapt to a wide variety of part shapes. But these features are included primarily to ensure a secure grip since gripper fingers are not capable of securely wrapping around the object like a dexterous hand. Therefore, known dexterous hands have not been fitted with V-block geometries. Yet, for identifying location of the secured part, dexterous hands have the greatest need for positional information because the dexterity creates a large set of stable grasped states relative to pivot- or parallel-jaw grippers. By including V-grooves, the dexterous hand of the present invention can exploit strategies that trap the part in known states.

A special and essential case of Vinger features occurs at fingertips to form the human-equivalent of fingernails. This location is perhaps the most important use of Vinger features because, in addition to reducing part-location error, it extends to small sizes the range of part sizes that a dexterous hand can secure.

The function of fingernails has been overlooked in the world of dexterous-hand designs and has no purpose in grippers. Vingernails 90 serve the same function at a smaller scale of locating target parts as do other Vinger features. But the additional function of securing the target becomes vital with parts too small to be grasped. Even, if the part can be grasped securely, grasping can only occur after initial capture with the essential aid of the Vingernails 90.

The overall configuration of the tip link 52 is significant. It has an angled, or "V", configuration 92 in side view. This angling is valuable in increasing the reach of the hand and its ability to pick up and grasp many objects. FIGS. 12 and 13 show grasping operations that take advantage of the V-finger configuration. More generally, the V-finger configuration facilitates a gripping or grasping between the middle link 50 and outermost tip link 52.

FIGS. 12-20 illustrate various further embodiments, methods of operation, and applications of the robotic hand 10 of the present invention.

FIG. 12, discussed above, illustrates the ability of the robotic hand 10 to position its three fingers in coordination with one another to grip a large plate-like object 100 between the outermost gripping pads 77c of the three fingers and the palm gripping pad 77a on the palm plate 44 of the base 54. The "sweep" fingers 46b and 46c are rotated to a position generally aligned with that of the fixed finger 46a. When so gripped, the hand 10 can transport or manipulate the object 100. Once clamped by the hand, the actuators 30 can be locked in position, thereby locking the grip on the plate 100.

FIG. 13 illustrates fingers 46b and 46c rotated to 180° opposite orientations where the Vingernails 90, 90 of the outermost links of these two fingers can engage and locate a small, elongated object 100 such as a pencil between the opposed Vingers formed by the outer links 52, 52 and their associated Vingernails 90. 90. The finger 46a plays no active role in this gripping or any manipulation of the pencil.

FIG. 14 shows an alternative embodiment of the invention where the dexterous robotic hand 10 has a base 54 in the form of an elongated member with an L-shaped cross-section, and "angle iron". The outward facing surfaces 54a, 54b of the base act as gripping surfaces in the manner of the palm surface 44 and pad 77a of the FIG. 3-11 embodiment. The FIG. 14 embodiment has one finger 46, mounted at its first link on the base. The finger 46 has three links in all and two rotary joints. This dexterity allows it to grip an object, e.g. a long cylindrical object 100 such as a length of pipe, as shown, by clamping the object against the base 54.

Figure 14A:
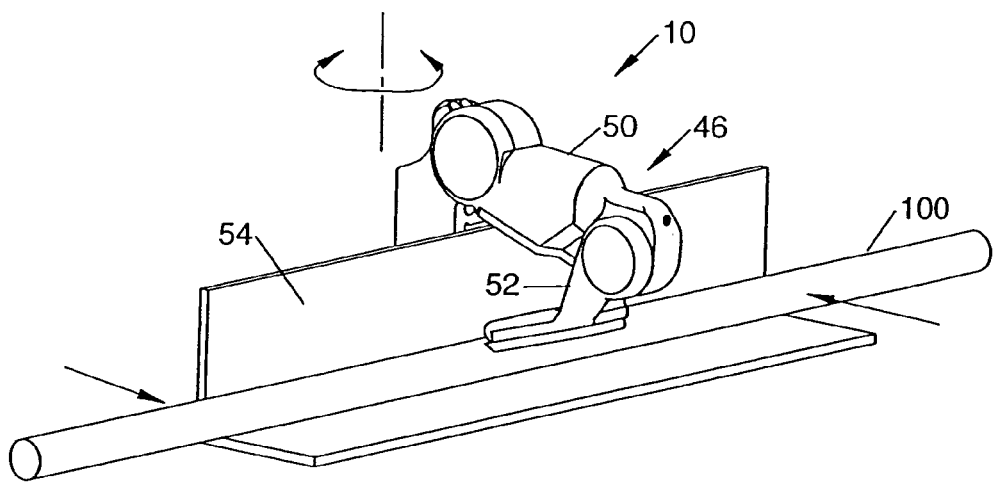
FIG. 14A is a view in perspective of another embodiment of a dexterous robotic hand according to the present invention adapted for gripping and manipulating elongated objects, particularly ones that can exhibit a high angular moment of inertia.
Figure 14B:
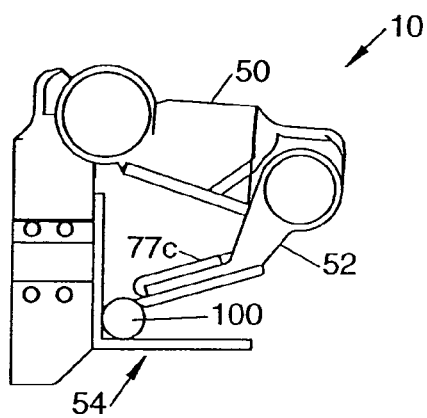
FIGS. 14B-E are views in vertical cross-section of the robotic hand shown in FIG. 14A illustrating its versatility in gripping objects with a wide variety of cross-sectional configurations and sizes.
Figure 14C:
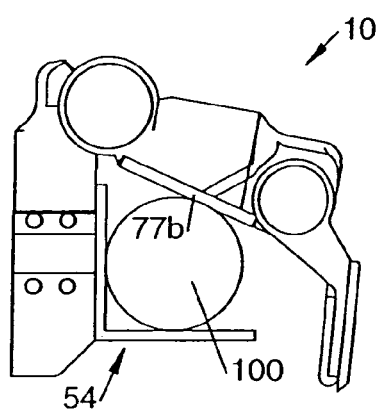
Figure 14D:
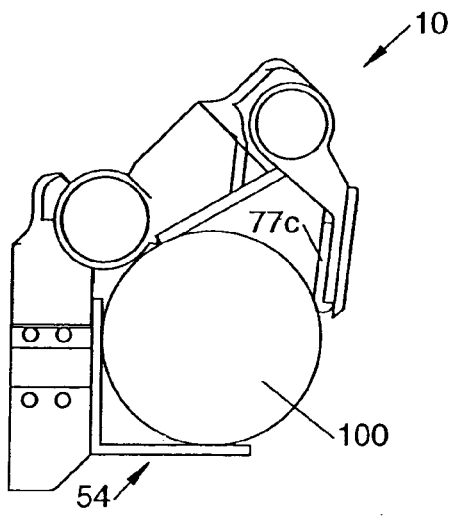
Figure 14E:
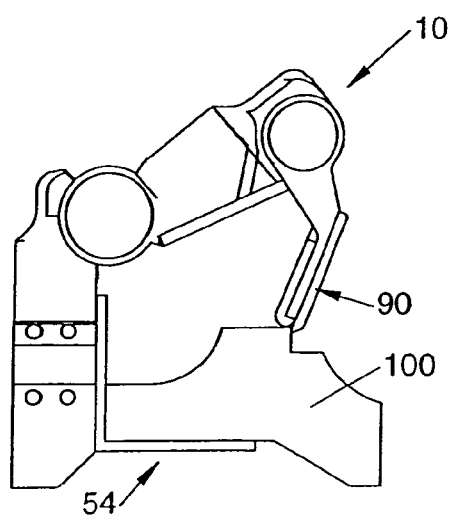

FIG. 14B-E show this robotic hand gripping objects 100 of various sizes and cross-sectional shapes, in each case using the dexterity and applied force control of the hand to grip to object against the base. FIG. 14B shows the use of the Vingernail 52 to grip a small diameter cylindrical object. FIG. 14C shows the use of gripping pad 77b on the second link 50 to grip a larger diameter object. FIG. 14D shows the use of the pads 77b and 77c to grip an even larger diameter cylindrical cross-section object 100. FIG. 14E shows the use of the Vingernail to engage a corner of a non-cylindrical object 100 to grip it against the base 54. The dexterity, range of motion, controlled power and positioning of the hand 10 allows this extreme versatility with one comparatively simple structure, not many gripping jaws as used in the prior art. Note that the angle beam base 54 provides support for the object 100 that couples the object to the base even if there is a sudden rotation of the entire object about an axis transverse to the axis of the object 100. The robotic hand 10 is therefore able to manipulate and transport objects with a high angular moment of inertia. For better gripping in the presence of high rotational forces, the hand 10 can use two or more fingers 46 spaced axially along the base 54.

Figures 15A, 15B:
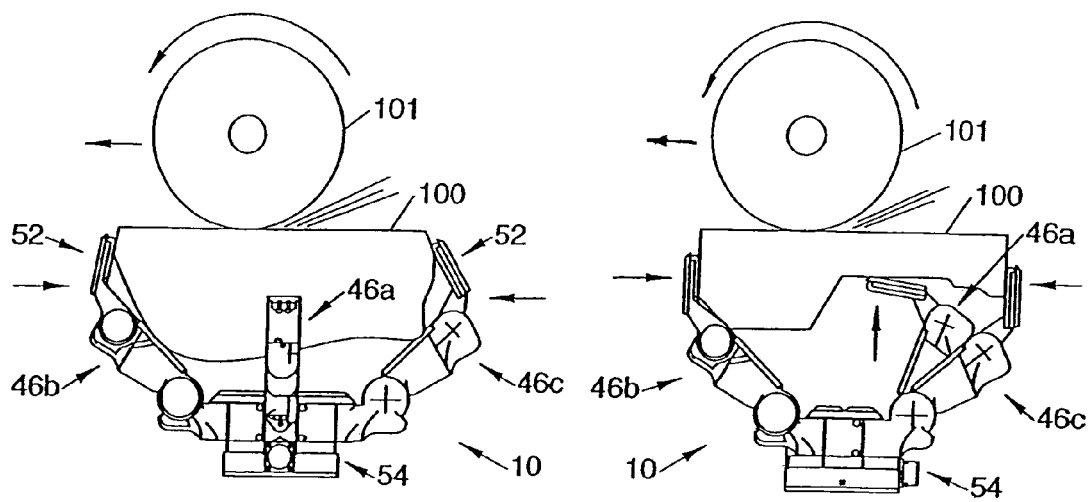
FIGS. 15A and 15B are views in side elevation of the dexterous robotic hand shown in FIGS. 3-11 used as a fixture in processing a workpiece, a grinding operation as shown.

FIG. 15 shows the robotic hand 10 operating as a fixture to hold a workpiece 100 of any of a wide variety of shapes and sizes during a processing step. A grinding operation is shown where castings are ground by a CNC grinder 101. This flexible fixture can receive, process, and release a successor of workpieces and process them to a wide range of manufacturing tolerances.

Figure 16:
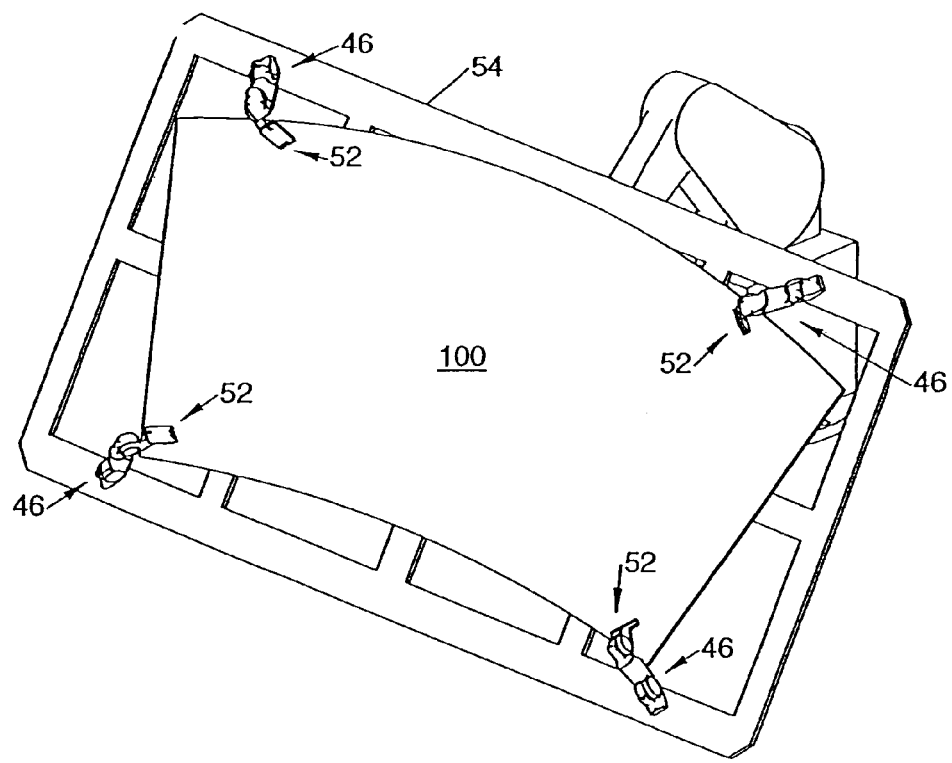
FIG. 16 is a view of another embodiment of the invention adapted for replaceably securing a large sheet object.

FIG. 16 shows another embodiment of a robotic hand 10 according to the present invention where the base 54 is a large, flat frame that supports a large, flat workpiece 100, e.g. a windshield for a car, or large, thin molded items, and several dexterous, two-degree-of-freedom finger 46 constructed and operated in accordance with the present invention. The frame-like base 54 can serve as a palm surface 44 as well as support for the fingers 46. The fingers can be fixed on the base frame 54, or replaceably fixed, as by bolting in various locations on the base frame. The fingers 46 have a common power and communications bus or buses (power and communications being separate) and operate in a coordinated manner under control of an overall network controller, NOD, as described in more detail below.

Figure 17:
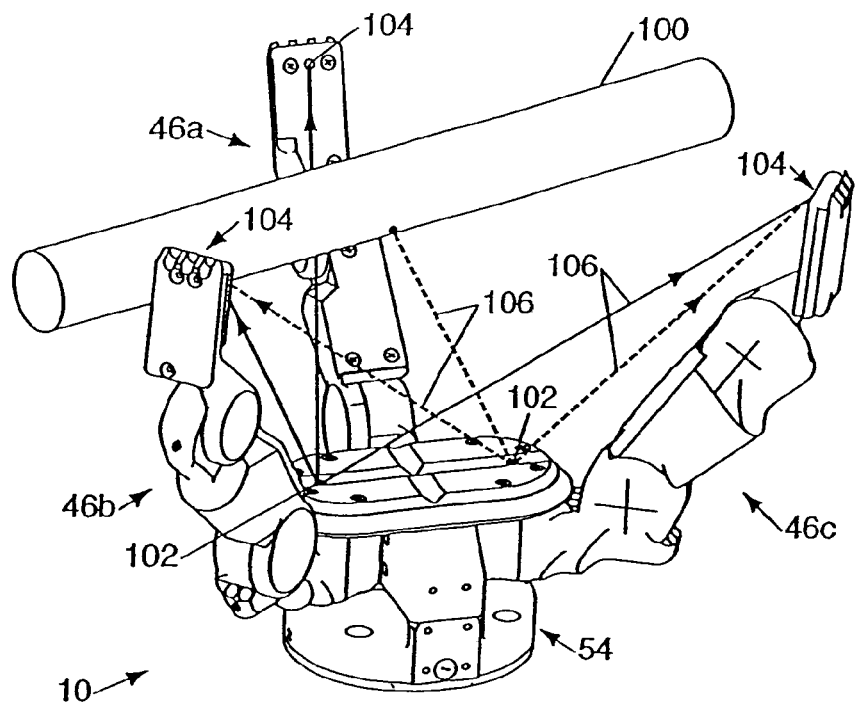
FIG. 17 is a view in perspective of another embodiment of the invention using light source and light detector pairs as sensors for object (a cylinder) location.

FIG. 17 shows a robotic hand 10 of the type shown in FIGS. 2-11 equipped with a type of vision sensors, i.e., electromagnetic radiation (e.g. light) sources 102 and detectors 104 of that radiation that define propagation paths 106 within the grasp of the hand 10. As shown, there are two LED light sources 102 both mounted in the palm 44 of the base 54 and oriented to direct output light "upwardly" as shown into an object grasping region defined by the fingers 46 and the palm 44. In the illustrated, exemplary embodiment, there are three photo detectors 104 each mounted on an "inwardly" facing surface at the outer end of the outermost links 52.

Ideally the light output by the LED's 102 is encoded, e.g. by different, non-multiple frequencies, to uniquely identify light from each source when it is received. The received, encoded light produces a corresponding electrical output signal, at the photo transistors detectors 104 that identifies one of the light sources 102, and thereby defines one of the possible light paths 106.

When an object 100, shown as a solid rod, enters within the grasp of the hand 10, it blocks one or more of the light paths 106. This in turn causes the signal output of one of more of the phototransistor detectors 104 to drop. This drop in output provides information to the hand 10 as to the location of the object 10 with respect to the hand. If continued relative movement of the hand 10 and the object 100 blocks other light lines 106, the control system of the hand acquires additional information as to the position and/or nature of the object 100. This information can be used, for example to initiate a gripping of the object by the hand when the object is positioned to enable such a grasping. This locating can be interactive, e.g., with movement of the hand 10 and its fingers 46 being activated to acquire additional information and/or position the hand to facilitate an interaction with, or avoidance of, the object 100.

Figure 18:
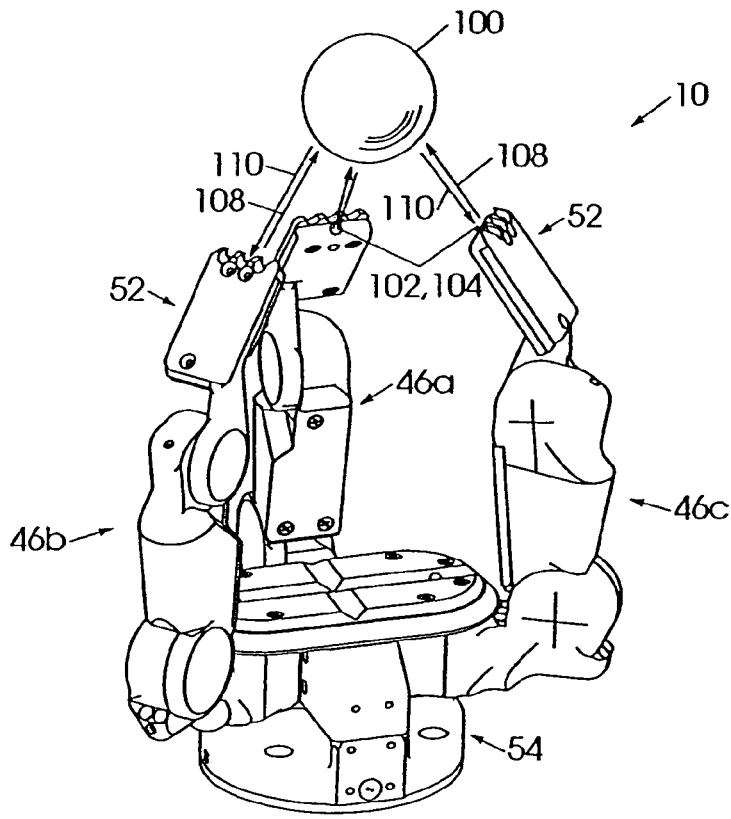
FIG. 18 is a view in perspective of another embodiment of the invention using light sources and light detectors mounted as sensors on a dexterous robotic hand to locate an object, shown here as a ball, in space by ranging and triangulation.

FIG. 18 shows a robotic hand of the type shown in FIGS. 2-11 equipped with electromagnetic radition (e.g. light) sources 102 and detectors 104 of that radiation mounted in pairs at the end of the outermost links 52 of the fingers 46 as vision sensors to locate objects in space accurately, in real time, and with hard-centric signal processing of the electrical output signals of the photodetectors 104. The light emitted by the light sources 102 is focused to follow a propagation path indicated by the light ray paths 108 in FIG. 18. If the light strikes an object 100 that is reflective to sufficient degree, a reflected beam of light 110 returns to the photodetector associated with the light source located at the tip of the same link 52. The emitted light can be encoded, e.g. by frequency, to uniquely associate it with a given light source to avoid crosstalk between light from the multiple light sources.

The distance between the known location of the vision sensors 102, 104 on each link 52 and the object can be calculated using known signal processing techniques by a time of flight measurement, or phase shift measurement. If an object is detected and the distance to it from any given finger is known, then its position in three-dimensional space can be calculated from the known location and orientation of the link 52 and the associated light pair 102, 104.

Figure 19:
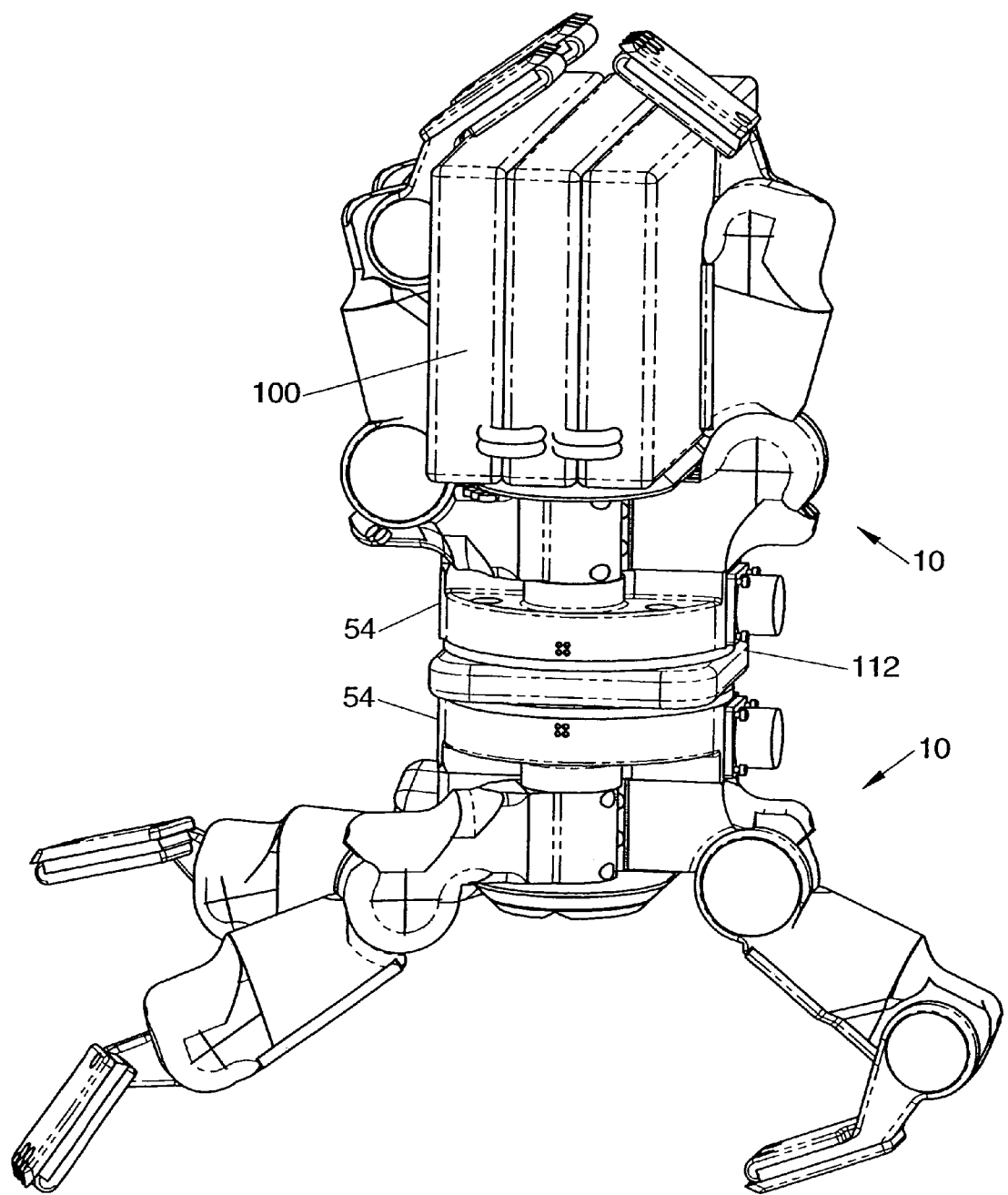
FIG. 19 is a view in perspective of a robotic device according to the present invention using two robotic hands of the type shown in FIGS. 3-11 mounted back-to-back with an intermediate, power supply for combined locomotion and manipulation.

FIG. 19 shows a robotic device formed by a pair of robotic hands 10 of the type described above with respect to FIGS. 2-11 secured in a back-to-back relationship with a mobile electrical power source 112 sandwiched between the palm surfaces 44, 44 of the hands 10,10. This device allows one hand 10 to operate in a walk mode, with the fingers 46 activated in coordination for locomotion, while the other hand 10 is available to, or in fact does, grasp an object 100.

One possible application of this embodiment is as an airdropped robotic device for clearing land mines. In operation, hands 10 are initially configures with their fingers 46 in tight fists so that the fingers are protected. The package is tossed out of a low-flying helicopter, impacts the ground, e.g., a beach, and rolls to a stop. A MEMS accelerometer in the electronics, which continually estimates the gravity vector, determines when that vector stops varying to determine that the unit has come to rest. The fingers 46 facing downwardly open to take the role of legs, and the fingers 46 facing upwardly take the role of dynamic balance arms in an algorithm that minimizes deviation from the gravity vector according to the accelerometer. This mobile robotic unit homes in on a nearby mine with the use of a number of hand-mounted sensors in several of the finger segments 48, 50, 52. The "legs" then dig for detected buried mines, and grasp around them with two legs, leaving a leg free. Then, the fingers on top, which had been helping to maintain balance, swing violently to one side in coordination with the free leg that springs down to roll the entire unit upside down so that the top and bottom hands swap places. Suddenly, the mine, grasped by the legs, is on top and what had been the free fingers become the legs, and the mine is carried off to a safe location.

Figure 20:
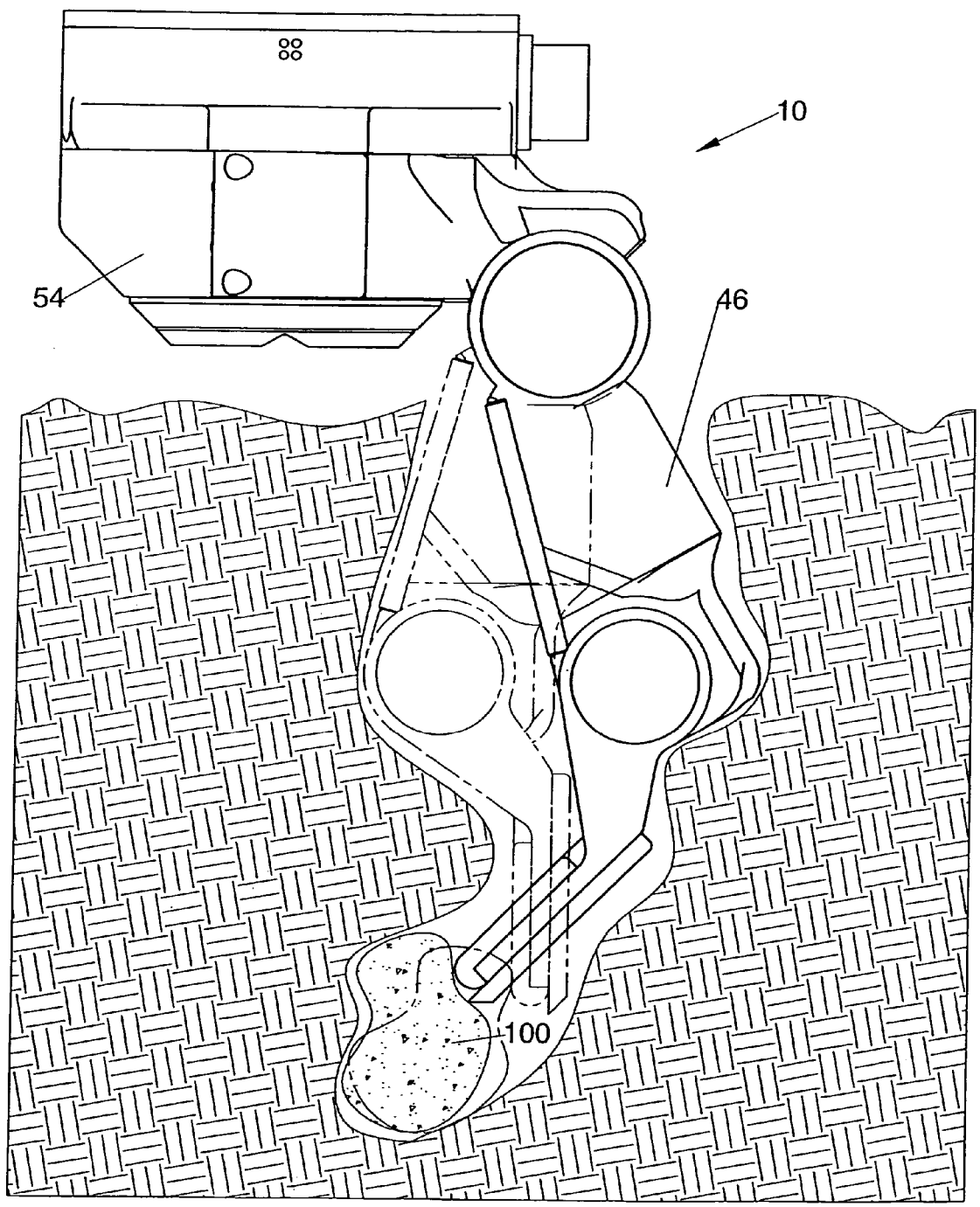
FIG. 20 is a view in side elevation and partially in section of a robotic device of the type shown in FIG. 2-11 operated to dig into the ground to retrieve a buried or submerged object.

FIG. 20 illustrates the digging operation of one of the hands 10. The fingers 46 of one hand 10 are driven to undulate in a manner that causes the entire robotic to dig into the ground.

Turning now to the control system 34, and with particular reference to FIGS. 7-11, NOD (acronym for "Network Operating Device") 38 orchestrates the activities of all the network of motors 30, especially where joint 32 coordinates are geometrically resolved into the inertial reference frame and visa versa in both the trajectory and force/torque senses. NOD 38 can be implemented on any number (including zero) of dedicated processors. In the case of zero dedicated processors, the NOD functionality is distributed among several TATER processors 40, exploiting surplus computation power. In the most elegant implementation of NOD, the functionality is distributed across several processors in such a way to create redundancy. The last implementation is especially useful for implementations in nuclear environments in which gamma particles and energized neutrons can flip data and program bits from 0 to 1 or 1 to 0 during operation.

NOD 38 also handles I/O communications outside the motor network, including translations between protocols. NOD may also be shared by multiple separate motor networks.

TATER (derived from "Commutator") 40 receives torque (or force) commands from NOD. There is one TATER circuit 40 per motor 30. While the commands can be received as trajectory commands (i.e. motor position and any of its mathematical derivatives with respect to time) motor torque is preferred. In the preferred torque implementation, TATER receives motor commands and broadcasts changes in position to NOD via CAN-bus 82. Based on the torque commands and any feedforward or model-reference adaptive control policies, TATER 40 then issues amplitude signals to the FET board 42. TATER's most important sensor is the motor position sensor, which, as indicated in FIG. 11, may be based on encoders, Hall-effect, resolvers, or even inferred from back-EMF. Meanwhile TATER 40 may also collect (usually from FET) updated sensed currents and/or component temperatures and motor temperature. Sensor feedback, illustrated as i-sense and i-sense [A:C] (A:C meaning for 3 phases A, B and C) in FIGS. 10 and 11, may be necessary when the application requires precise torque control. TATER 40 uses most of the local feedback from FET 42 and the motor for commutation, though some of this information may be relayed back to NOD 38.

For implementation with electric motors, one FET circuit 42 is associated with one TATER 40 and one motor 30, although multiple FET circuits 42 may share one circuit board. FET 42 and TATER 40 may also share a circuit board 74. FET 42 alone handles high-current power lines, and so when scaling motor size only, then only FET is affected. FET's acronym is derived from it most important component, the Field-Effect Transistor. The FET circuit 42 contains a number of FETs. The FETs control the torque or force by supplying the instantaneously correct current to each of the coils of the motor. FIG. 11 shows a standard drive and PWM commutation circuit for a 3 phase DC brushless motor, the preferred actuator or drive for the rotating joints 32.

In the exemplary hand 10 illustrated herein, there are three Hall-effect sensors. Working with six permanent magnets on the rotor, the precision of the Hall-effect sensors is 360° divided by eighteen (three sensors and six magnets) or 20°. As noted above, gearing in the transmission between the motor output and the link allows a precision in the movement ($\Delta\theta$) of the rotor to be controlled to about ½ degree in the example given. The degree of precision can, of course, be varied as needed for different applications.

Figure 9:
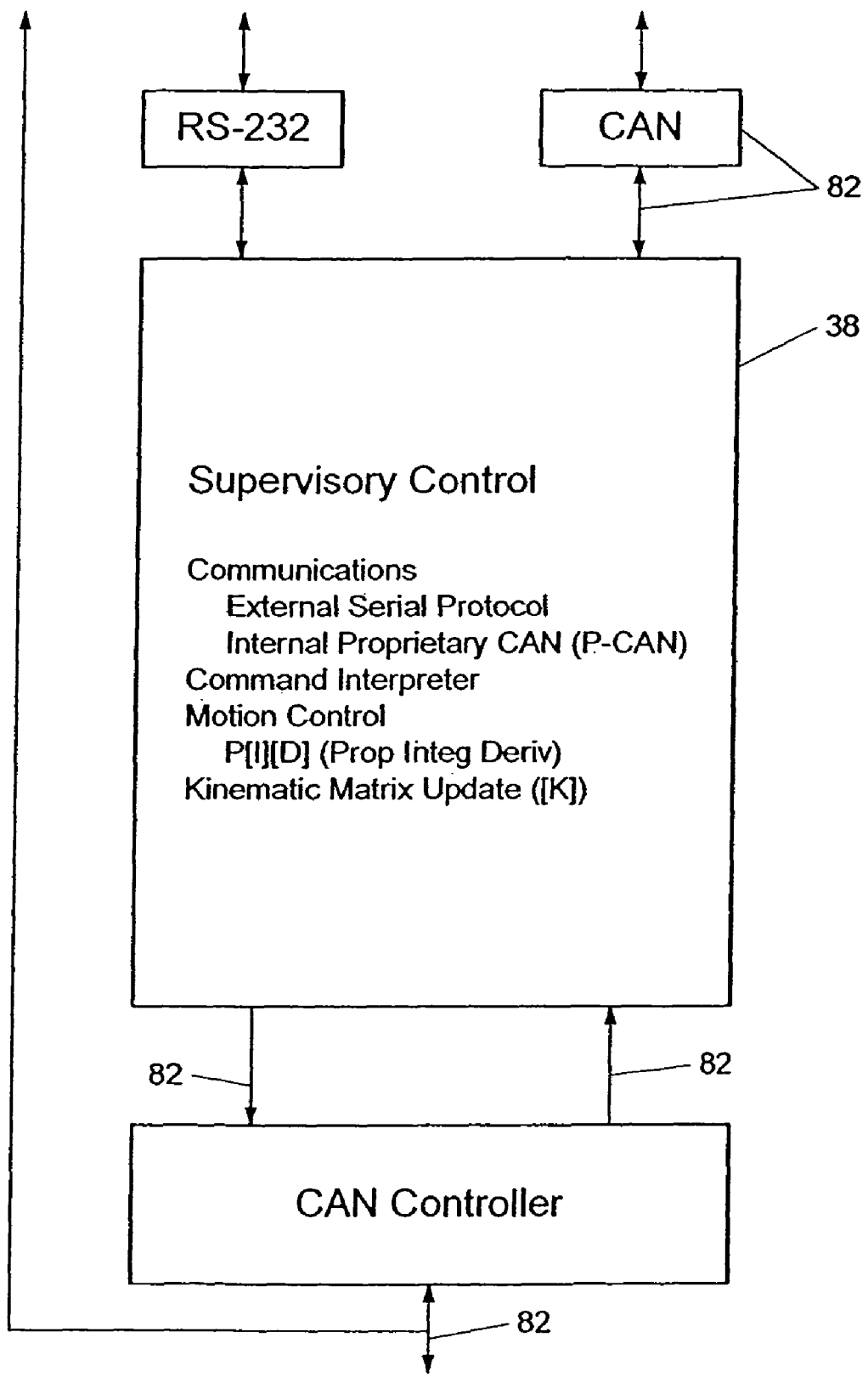
FIGS. 9-11 are a more detailed schematic functional block representation of the control system shown in FIGS. 7 and 8, with FIG. 7 showing the NOD chip function and CAN communications protocol controller which communicates with the TATER local control shown in FIG. 10, which in turn communicates with the FET controller, including conventional commutator logic as shown in FIGS. 10 and 11.
Figure 10:
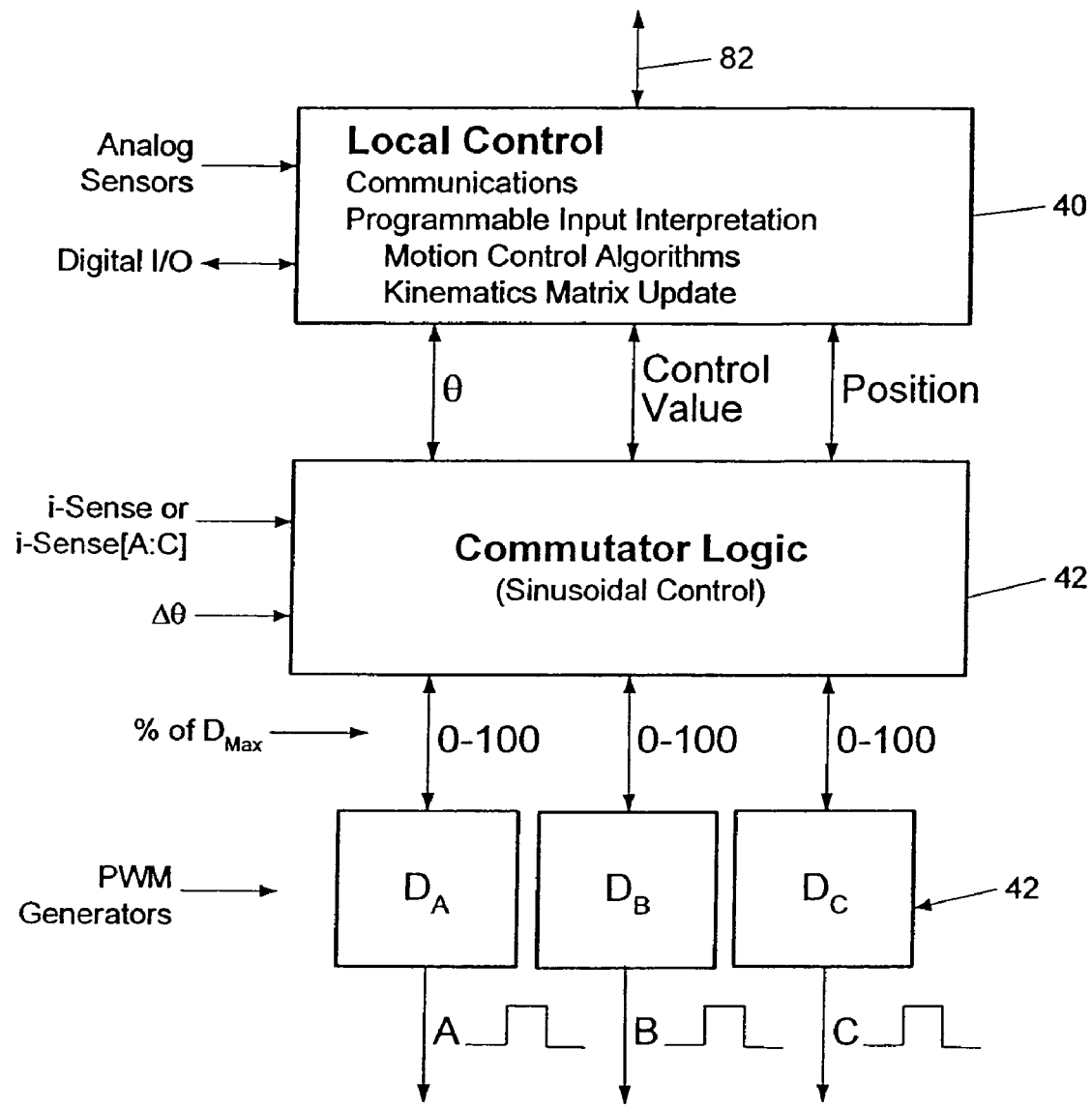
Figure 11:
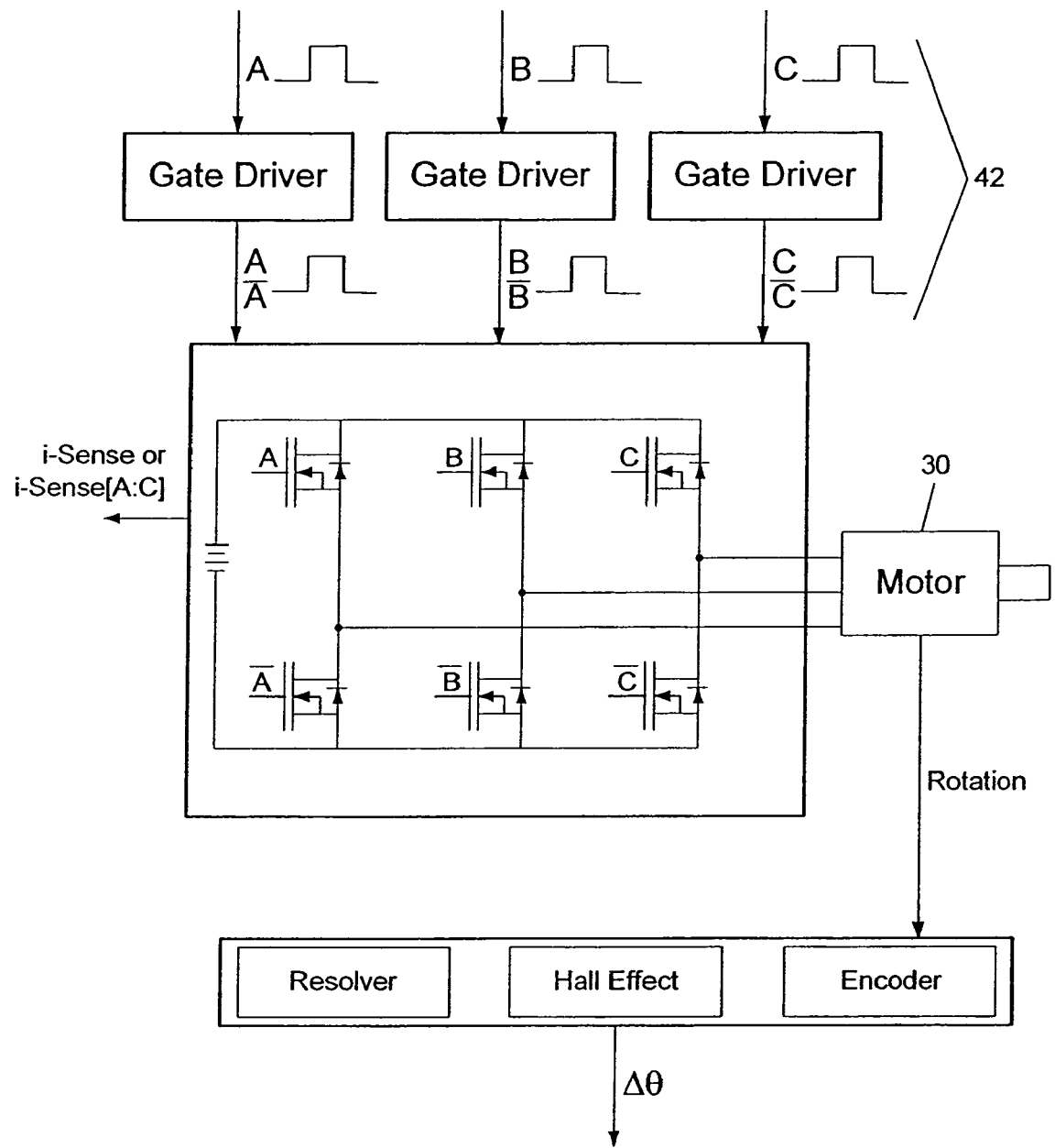

FIGS. 9 and 10 refer to P-CAN for internal communication among the NOD and TATER processors. P-CAN, as noted above, is an HLP that is tailored to the present robotics application. The control network 34 uses 2-wire CAN at its maximum baud rate (1 Mbaud) as defined in its ISO specification. But, instead of a single bus with a termination at each end and all nodes placed in between, the present invention uses a star topology with three terminations, one at the tip 52 of each finger. This eliminates having to run signal wires out to the end of each finger and back to go to the next finger (reducing wiring complexity, cost, and reducing wire-bending breakage potential by 50%).

Instead of implementing one of the "standard" higher-layer protocols (HLPs) on top of our CAN bus, it is preferred to use P-CAN for efficient distributed processing. P-CAN HLP uses the 11-bit addressing mode of ISO CAN (the 29-bit mode uses too much bandwidth for 1 kHz motor control), assigning a unique maskable bit to each of the 8 nodes (each of 7 "TATERS" and 1 "NOD"). This allows any node to communicate with any other single node or set of nodes without interfering with the processing of the rest of the nodes.

The control language implemented on the CAN bus 82 is optimized for high-speed motor control loops across multiple motors. Each "TATER" 40 contains a set of about 50 properties (nouns) detailing the operation of the motor 30 it is controlling. Some properties are DUTY_CYCLE, TEMPERATURE, POSITION, TORQUE, etc. There are only two actions (verbs) in the system, GET and SET. If motor "4" (e.g. motor 30b in the stationary fixed finger) wants to know the DUTY_CYCLES of motors "3" and "5", it issues a command of the form: [To nodes 3 and 5] [I am node 4] [GET] [your DUTY_CYCLE]. This message is placed on the CAN bus, and the CAN layer routes it to nodes 3 and 5. Nodes 3 and 5 process the message and find that node 4 sent it. They each begin building a reply (in parallel, and while they are not busy commutating their own motors) starting with [To node 4] [ am node 3] (for example). Then nodes 3 and 5 append [SET] [my DUTY_CYCLE is] [35 percent] (for example). Nodes 3 and 5 then place their messages on the CAN bus, which routes the packets to node 4. Node 4 reads the messages, stores the data, and is now able to act on the new information it just received. This all happens at 1 Mbaud, and does not interfere with nodes 0, 1, 2, 6 and 7.

Using the power of "selected broadcasting" the P-CAN implementation of CAN provides the ability to manage the resource of power in the system. If it is known before installation that the robot is limited to a total current draw of, say, 16 amps, that MAX_CURRENT value can be broadcast to each of the "TATERs" 40 upon powerup (and is saved during shutdown). The "TATERs" 40 set their initial CURRENT_LIMIT to zero upon powerup. They also keep a table of every other motor's CURRENT_LIMIT.

When TATER 40 is commanded to do something that requires more current than their present CURRENT_LIMIT, it adds up "current limit" table and checks the sum against the known MAX_CURRENT. If there is available current, it increases its own CURRENT_LIMIT by a set amount, and broadcasts its new CURRENT_LIMIT to each of the other "TATERS" 40, so they may update their respective "current limit" table. Conversely, if a TATER realizes that it is not using as much current as its present CURRENT_LIMIT allows, it reduces its own CURRENT_LIMIT and broadcasts that new value to its peers.

If, when the "TATER" 40 adds up its "current limit" table, it finds that there is no more current available, it simply uses its CURRENT_LIMIT as a limiting control parameter this time through the control loop and tries again next time (if necessary).

An alternative way to accomplish this would be to broadcast a [GET] [your CURRENT_LIMIT] message to each of the "TATERs" each time through the control loop, to see if there is enough leftover current. But this would require much more bandwidth as it would happen every time the control loop executes (a thousand times per second) and it would require both a broadcast question and an individual response from each "TATER" 40.

This distributed power management feature provides an efficient and simple, yet very flexible and effective way to set limitations on the power consumed by the robot. In particular, as the size of the wires W that carry power is a significant design problem for any dexterous hand, power allocation can be used to assure that no one wire of three wires for a three-phase motor will be required to carry a maximum possible power load. This allows the use of smaller wires, a significant advantage.

While the invention has focused on an intelligent, self-contained robotic hand, the invention can be used in other robotic applications, e.g. a robotic arm, or more complex structures such as the device shown in FIG. 19.

Also, while hard wire I/O to the robotic hand 10 has been described, it will be understood that communications with the hand can be wireless, infrared or radio.

Further, while a back-to-back coupling of two hands 10 has been discussed, side-by-side couplings of hands 10 are also possible, and other combinations such as back-to-back and side-to-side.

Still further, while the communications architecture has had transmissions out to finger links, it is also possible to back drive the hand 10. For example, a load cell or other sensor can be mounted at an outer finger like to produce a control signal used to back drive the associated finger link(s).

Further, while the hand 10 has been described with sensors mounted to interact with objects and their environment, tools such as conventional grippers can also be mounted and powered and controlled by the hand 10.

Feed-through programming is also possible. One can input six numbers (e.g. three for distance and three for angular orientation). Software can develop appropriate signals to move the hand to that designated point.

These and other modifications and variations will occur to those skilled in the art from reading the foregoing specification and the accompanying drawings. These modifications and variations are intended to fall within the scope of the appended claims.

What is claimed is:

1. A process for anodizing a robotic device having structural components rotatably connected to one another at rotary joints, the robotic device having an outer housing formed of an electrically conductive material that forms at least one interior cavity that contains electrical components of the robotic device, the at least one interior cavity having an opening, the process comprising:

providing anodizing solution;

sealing the opening of the at least one interior cavity in order to prevent a flow of said anodizing solution into said at least one interior cavity when the device is immersed in said anodizing solution, wherein said sealing comprises replaceably sealing the opening of the at least one interior cavity with a generally circular cover, wherein the generally circular cover comprises an O-ring seal disposed at the periphery of the generally circular cover, and wherein the generally circular cover is positioned in the opening of the at least one interior cavity so that the cover seals against the adjacent surfaces of the at least one interior cavity;

electrically connecting all of the exterior structural components of the robotic device, including the rotary joints;

immersing said sealed and electrically connected robotic device in said anodizing solution; and applying an electrical current through the solution and the immersed robotic device to effect an anodizing of all the exposed exterior surfaces of the robotic device without a pre-masking of the robotic device.

2. The anodizing process of claim 1 further comprising rinsing the anodized robotic device in a rinse solution and controlling the temperature of said anodizing solution and said rinse solution, to similar values to control the development of pressure gradients that degrade said sealing.

3. The anodizing process of claim 1 wherein the robotic tool is formed of aluminum and said solution providing and applying of electrical current produce a Teflon® anodized layer.

4. The anodizing process of claim 1 wherein said sealing further comprises securing said circular covers to the structural components with screws formed of a material resistant to the anodizing.

* * * * *